US009372481B2

(12) United States Patent
Matsutani

(10) Patent No.: US 9,372,481 B2
(45) Date of Patent: Jun. 21, 2016

(54) ENCODER, MOTOR WITH ENCODER, SERVO SYSTEM, AND SIGNAL PROCESSING METHOD FOR ENCODER

(71) Applicant: KABUSHIKI KAISHA YASKAWA DENKI, Kitakyushu-shi (JP)

(72) Inventor: Yasuhiro Matsutani, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 45 days.

(21) Appl. No.: 14/533,235

(22) Filed: Nov. 5, 2014

(65) Prior Publication Data

US 2015/0123589 A1 May 7, 2015

(30) Foreign Application Priority Data

Nov. 5, 2013 (JP) ................................. 2013-229837

(51) Int. Cl.
*G01D 5/245* (2006.01)
*G05B 23/02* (2006.01)

(52) U.S. Cl.
CPC .................................. *G05B 23/0224* (2013.01)

(58) Field of Classification Search
CPC ......... H04N 5/144; G01D 9/08; G01D 9/285; G01D 5/245; H03M 5/145; G01P 21/02; G02B 21/26; G02B 21/34; G05B 23/0205
USPC .......................... 318/600–605, 652, 653, 661
See application file for complete search history.

(56) References Cited

U.S. PATENT DOCUMENTS 4,320,662 A * 3/1982 Schaub ................. G01M 13/02 702/145
5,839,957 A * 11/1998 Schneider ............... G07F 17/34 273/143 R
7,547,875 B1 * 6/2009 Tsai ................... G01D 5/24447 250/205
9,140,581 B2 * 9/2015 Shimada .............. G01D 5/2448

FOREIGN PATENT DOCUMENTS

JP 63-300911 A 12/1988
JP 09-105644 A 4/1997
JP 2009-128089 A 6/2009
JP 2009-195087 A 8/2009
JP 2012-108159 A 6/2012

OTHER PUBLICATIONS

Office Action issued Feb. 15, 2016, in Japanese Patent Application No. 2013-229837, filed Nov. 5, 2013.

* cited by examiner

*Primary Examiner* — Bentsu Ro
(74) *Attorney, Agent, or Firm* — Oblon, McClelland, Maier & Neustadt, L.L.P.

(57) ABSTRACT

An encoder includes a measurement target which is coupled to a motor, a module which is positioned relative to the measurement target and generates signals based on motion of the measurement target, and a control device which generates and outputs position data based on the signals from the module and includes a position detector, an abnormality detector, a cause analyzer, a non-volatile memory, and a non-volatile memory controller. The position detector detects a position of the motor, the abnormality detector detects an abnormality based on state information including a state of the position detector, the cause analyzer analyzes the state information when the abnormality detector detects the abnormality such that a cause of the abnormality detected by the abnormality detector is identified, and the non-volatile memory controller stores in the non-volatile memory a result of analysis obtained by the cause analyzer.

20 Claims, 13 Drawing Sheets

ENCODER, MOTOR WITH ENCODER, SERVO SYSTEM, AND SIGNAL PROCESSING METHOD FOR ENCODER

CROSS-REFERENCE TO RELATED APPLICATIONS

The present application is based upon and claims the benefit of priority under 35 U.S.C. §119 to Japanese Patent Application No. 2013-229837, filed Nov. 5, 2013. The contents of this application are incorporated herein by reference in their entirety.

BACKGROUND OF THE INVENTION

1. Field of the Invention

The present invention relates to an encoder, a motor with an encoder, a servo system, and a signal processing method for an encoder.

2. Description of Background Art

Japanese Unexamined Patent Application Publication No. 63-300911 describes an encoder including an abnormality detection circuit that detects an abnormality of voltage. When the abnormality detection circuit detects an abnormality, the encoder performs serial transmission of an abnormality detection signal to a receiving side device. The entire contents of this publication are incorporated herein by reference.

SUMMARY OF THE INVENTION

According to one aspect of the present invention, an encoder includes a measurement target which is coupled to a motor, a module which is positioned relative to the measurement target and generates signals based on motion of the measurement target, and a control device which generates and outputs position data based on the signals from the module and includes a position detector, an abnormality detector, a cause analyzer, a non-volatile memory, and a non-volatile memory controller. The position detector detects a position of the motor, the abnormality detector detects an abnormality based on state information including a state of the position detector, the cause analyzer analyzes the state information when the abnormality detector detects the abnormality such that a cause of the abnormality detected by the abnormality detector is identified, and the non-volatile memory controller stores in the non-volatile memory a result of analysis obtained by the cause analyzer.

According to another aspect of the present invention, a servomotor includes a motor, and an encoder which detects position information and/or speed information of the motor. The encoder includes a measurement target which is coupled to the motor, a module which is positioned relative to the measurement target and generates signals based on motion of the measurement target, and a control device which generates and outputs position data based on the signals from the module and includes a position detector, an abnormality detector, a cause analyzer, a non-volatile memory, and a non-volatile memory controller. The position detector detects a position of the motor, the abnormality detector detects an abnormality based on state information including a state of the position detector, the cause analyzer analyzes the state information when the abnormality detector detects the abnormality such that a cause of the abnormality detected by the abnormality detector is identified, and the non-volatile memory controller stores in the non-volatile memory a result of analysis obtained by the cause analyzer.

According to yet another aspect of the present invention, a signal processing method for an encoder includes detecting an abnormality based on state information including a state of a position detector in an encoder, analyzing the state information when the abnormality is detected such that a cause of the abnormality is identified, and storing in a non-volatile memory a result of analysis for the cause of the abnormality obtained in the analyzing of the state information. The position detector detects a position of a motor coupled to a measurement target in the encoder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
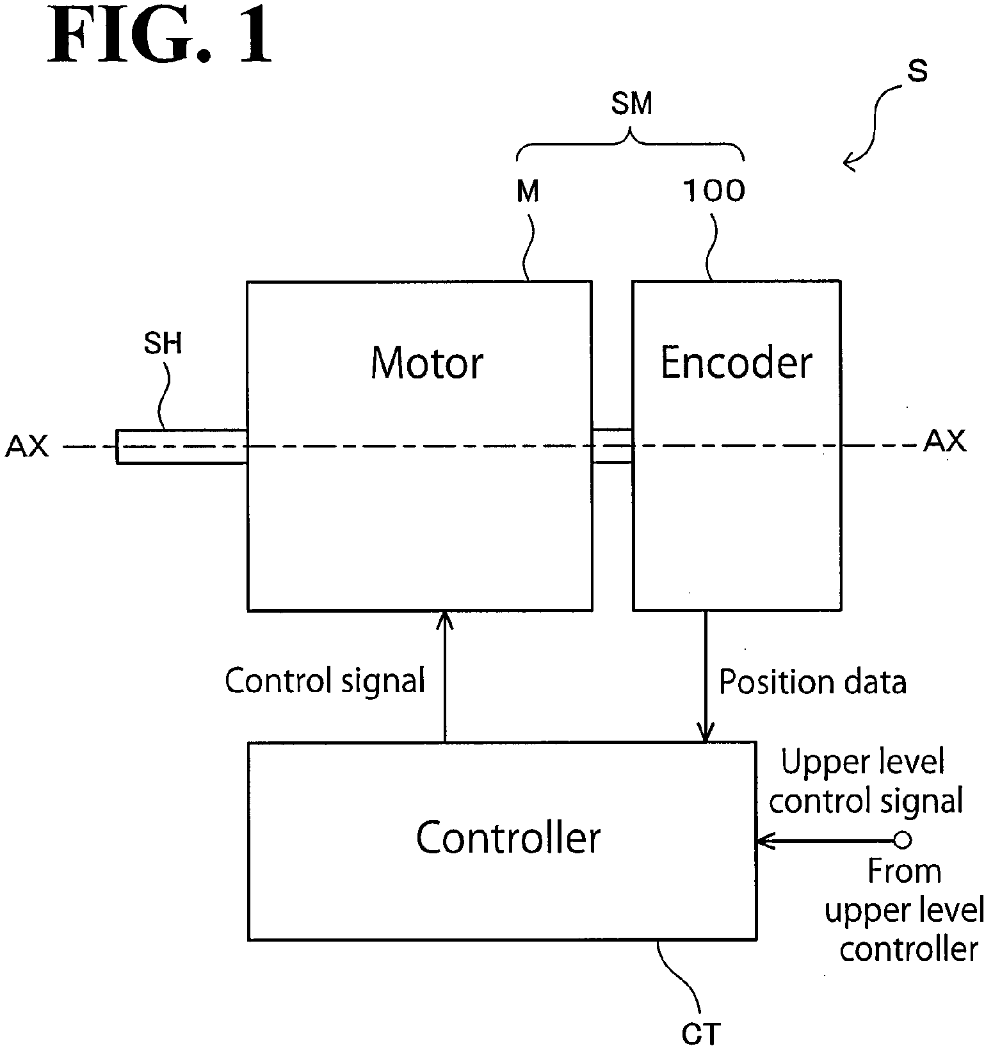
FIG. 1 is a diagram illustrating a schematic structure of a servo system according to a first embodiment.

The embodiments will now be described with reference to the accompanying drawings, wherein like reference numerals designate corresponding or identical elements throughout the various drawings.

The encoders according to the following embodiments are applicable to various types of encoders, including rotary type encoders and linear type encoders. In the following description, a rotary type encoder will be taken as an example to facilitate understanding of the encoder. In other types of encoder applications, modifications suitable for the application are made, including replacing a measurement target in the rotary type encoder with a measurement target in the linear type encoder, that is, replacing a disk with a linear scale, which will not be elaborated herein.

First Embodiment

1-1. Servo System

A schematic structure of a servo system according to this embodiment will be described by referring to FIG. 1.

As shown in FIG. 1, a servo system (S) according to this embodiment includes a servomotor (SM) and a controller (CT). The servomotor (SM) includes a motor (M) and an encoder 100.

The motor (M) is an exemplary power source without the encoder 100. The motor (M) is a rotary type motor, in which a rotor (not shown) rotates relative to a stator (not shown). A shaft (SH) secured to the rotor rotates about an axis AX to output rotational force.

Although the motor (M) alone is occasionally referred to as a servo motor, the servomotor (SM) as used in this embodiment refers to a structure including the encoder 100. That is, the servomotor (SM) is an example of the motor with an encoder. For convenience of description, the following description is concerning such a servomotor that the motor with the encoder is controlled to follow a target value of a position, speed, or another parameter. It should be noted, however, that the motor with the encoder will not necessarily be limited to the servomotor. The motor with the encoder encompasses motors not used in servo systems, insofar as the encoder is provided. For example, the output from the encoder may be used for display purposes.

There is no particular limitation to the motor (M) insofar as the encoder 100 is capable of detecting, for example, position data or other data that will be described later. Also the motor (M) will not be limited to an electric motor, which utilizes electricity as power source. Examples of motors that use other power sources include hydraulic motors, pneumatic motors, and steam motors. In the following description, the motor (M) is an electric motor for convenience of description. Also for convenience of description, the motor (M) in the following description is a three-phase AC (alternating-current) motor, which receives three-phase (U-phase, V-phase, and W-phase) power supplied from a three-phase AC power source. This, however, should not be construed as limiting the motor M to the three-phase AC power source. Other possible examples of the motor (M) include, but are not limited to: a single-phase DC (direct-current) motor, which receives single-phase DC power; a multi-phase DC motor, which receives multi-phase DC power; a single-phase AC motor, which receives single-phase AC power; and a multi-phase AC motor that receives multi-phase AC power other than three-phase power. Also for convenience of description, the number of magnetic poles of the motor (M) is two in the following description. The number of magnetic poles of the motor (M), however, will not be limited to two; other possible examples include four, six, and eight.

The encoder 100 is coupled to a side (occasionally referred to as "anti-load side") of the shaft (SH) opposite to the rotational force output side (occasionally referred to as "load side") of the shaft (SH). The position to couple the encoder 100 will not be limited to the side opposite to the rotational force output side of the shaft (SH), and may be at the rotational force output side of the shaft (SH). The encoder 100 detects the position of the shaft (SH) to detect the position of the motor (M) (this position is also referred to as "rotational angle"). The encoder 100 outputs position data indicating the position of the motor (M).

Instead of or in addition to the position of the motor (M), the encoder 100 may detect the speed (also referred to as "rotation speed" or "angular velocity") and/or the acceleration (also referred to as "rotational acceleration" or "angular acceleration") of the motor (M). The speed and the acceleration of the motor (M) are detectable by exemplary processing such as first or second order time-differential of the position, and counting electrical signals from light-receiving elements in a light-receiving array (PI), described later, for a predetermined period of time. In the following description, the physical amount detected by the encoder 100 is the position for convenience of description.

The controller (CT) acquires position data output from the encoder 100, and controls the rotation of the motor (M) based on the position data. Thus, in this embodiment, in which the motor (M) is an electric motor, the controller (CT) controls current, voltage, or the like to be applied to the motor (M) based on the position data so as to control the rotation of the motor (M). The controller (CT) may also acquire an upper level control signal from an upper level controller, not shown. In this case, the controller (CT) may control the motor (M) to output from the shaft (SH) a rotational force with which the position or the like indicated by the upper level control signal is achievable. When the motor (M) is driven by another power source such as a hydraulic power source, a pneumatic power source, and a steam power source, the controller (CT) may control the supply from the power source to control the rotation of the motor (M).

1-2. Encoder

A structure of the encoder 100 according to this embodiment will be described by referring to FIGS. 2 to 4.

Figure 2:
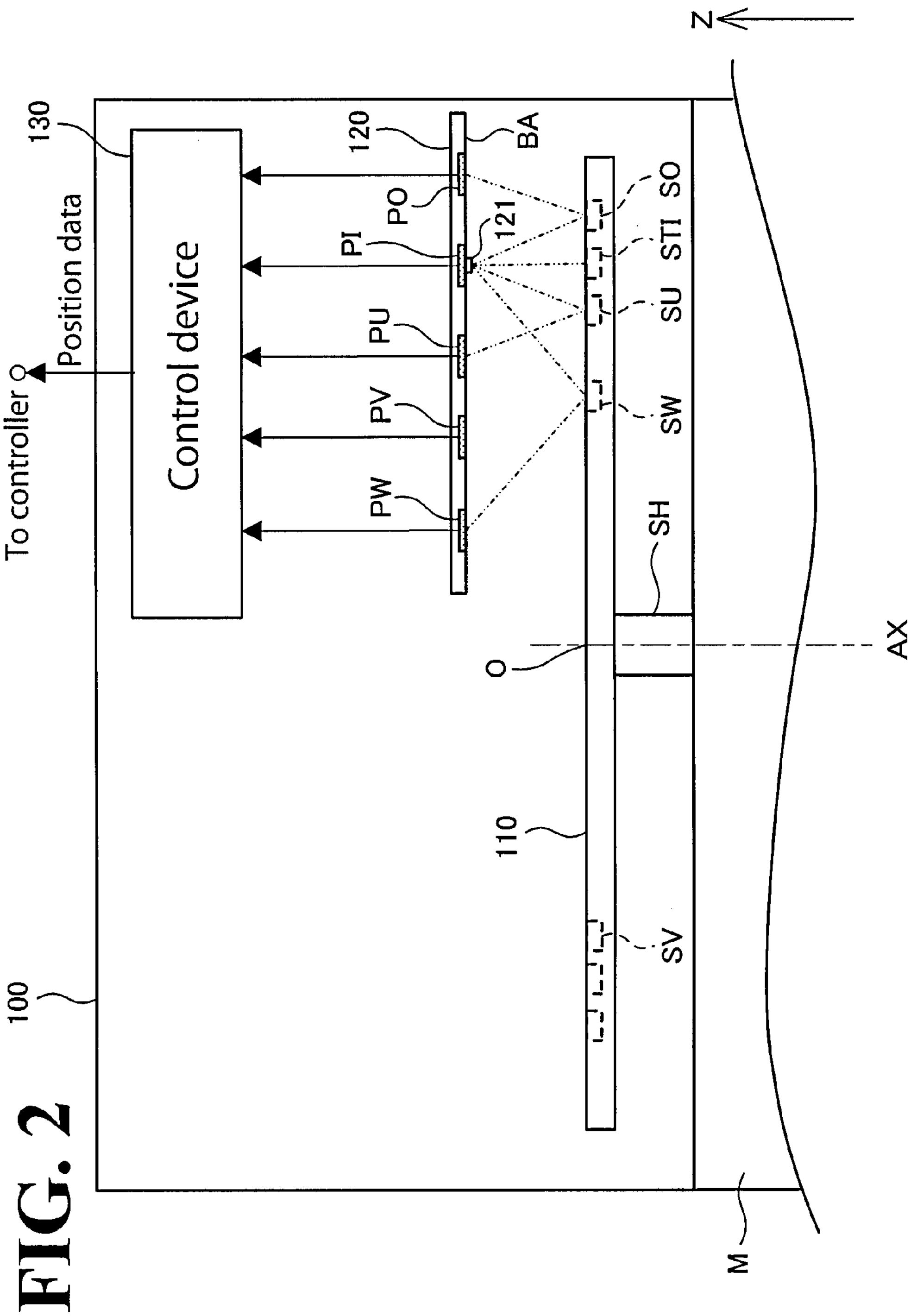
FIG. 2 is a diagram illustrating a structure of an encoder according to the first embodiment.
Figure 3:
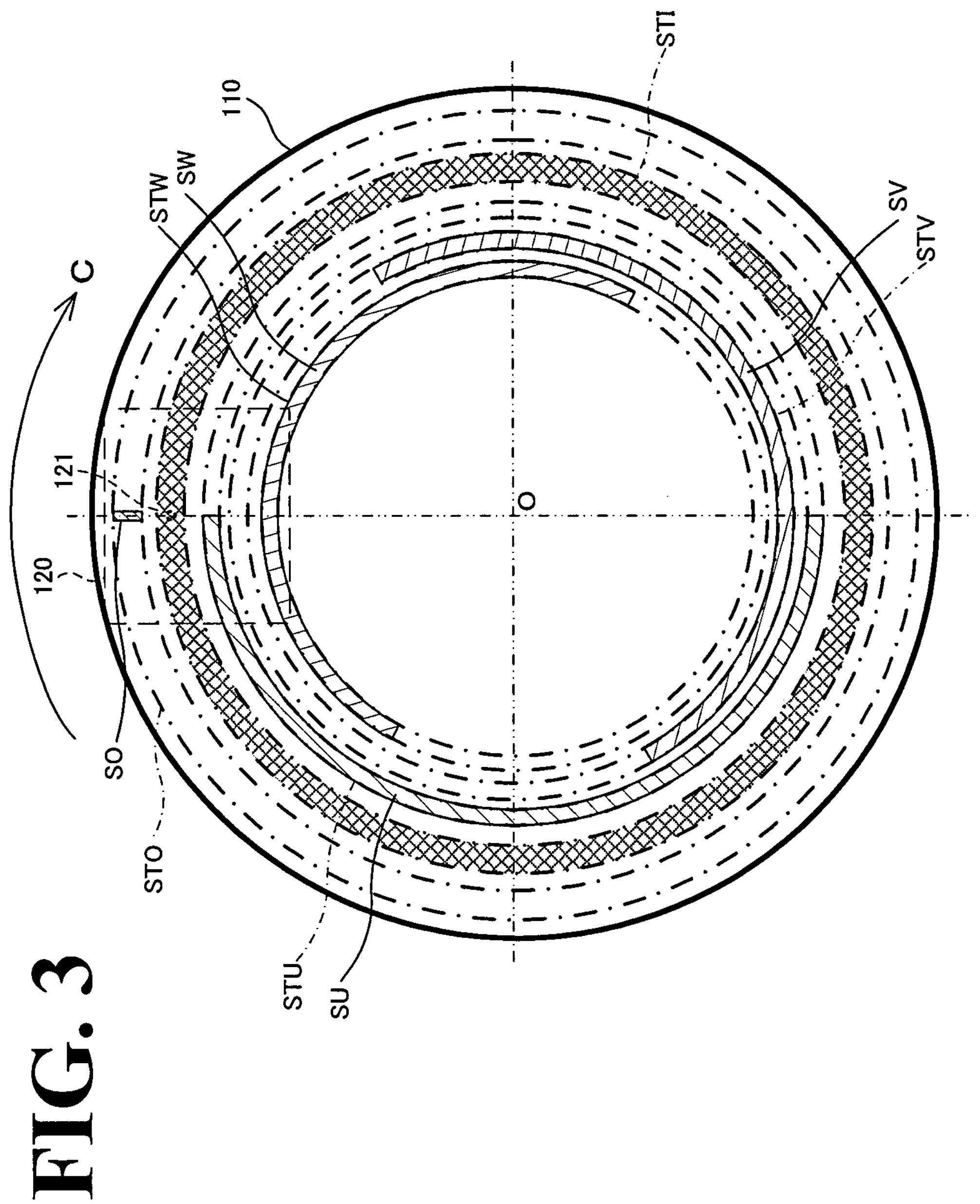
FIG. 3 is a diagram illustrating a structure of a disk according to the first embodiment.
Figure 4:
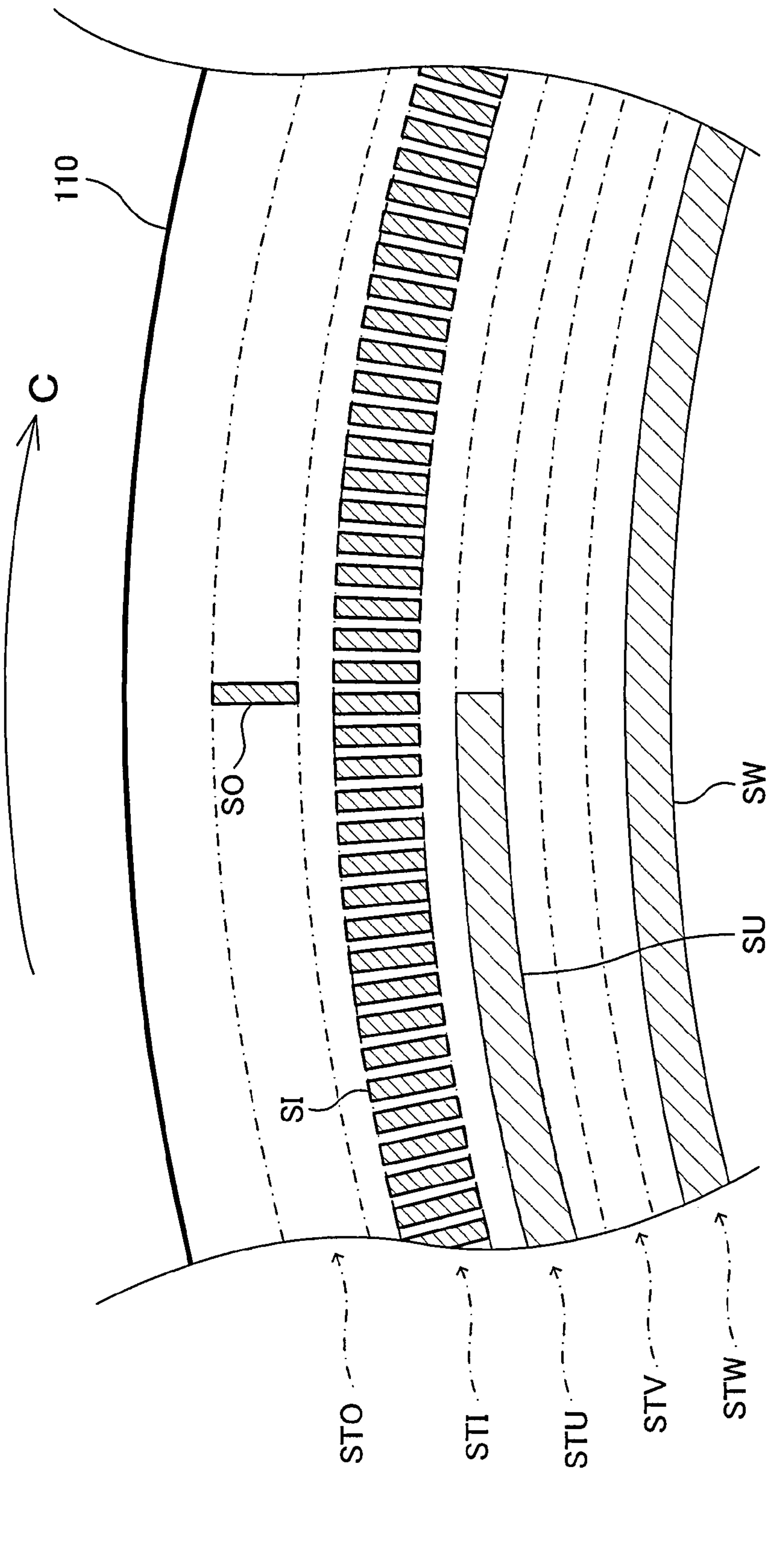
FIG. 4 is a diagram illustrating a structure of slit tracks according to the first embodiment.

As shown in FIGS. 2 to 4, the encoder 100 according to this embodiment includes a disc-shaped disk 110, an optical module 120, and a control device 130.

For convenience of description of the encoder 100, the directions including the upper and lower directions are defined in the following manner and used as necessary. The direction in which the disk 110 faces the optical module 120, that is, the positive direction in a Z axis direction is defined as "upper direction", while the negative direction in the Z axis direction is defined as "lower direction". It should be noted, however, that the directions including the upper and lower directions are subject to change in accordance with how the encoder 100 is installed. Hence, the definitions should not be construed as limiting the positional relationship of the components of the encoder 100.

1-2-1. Disk

The disk 110 is coupled to the shaft (SH) with its disk center (O) approximately matching an axis AX, so that the disk 110 rotates together with the rotation of the motor (M). In this embodiment, the disk 110 is taken as an example of the measurement target for measuring the rotation of the motor (M). The measurement target may be any of other members than the disk 110, examples including an end surface of the shaft (SH). While in the example shown in FIG. 2 the disk 110 is directly coupled to the shaft (SH), the disk 110 may alternatively be coupled to the shaft (SH) through a coupling member such as a hub.

The disk 110 includes, on its upper surface, five slit tracks (STI, STO, STU, STV, STW). The disk 110 rotates together with the rotation of the motor (M) as described above, whereas the optical module 120 is fixed while facing part of the slit tracks (STI, STO, STU, STV, STW). Thus, together with the rotation of the motor (M), the slit tracks (STI, STO, STU, STV, STW) and the optical module 120 move relative to each other in the measurement direction (which is the direction indicated by the arrow (C) in FIG. 3 and other drawings, and hereinafter occasionally referred to as "measurement direction (C)").

As used herein, the term "measurement direction" refers to a measurement direction in which the optical module 120 optically measures the slit tracks (STI, STO, STU, STV, STW). In a rotary type encoder in which the measurement target is a disk, as in the rotary type encoder 100 with the disk 110 according to this embodiment, the measurement direction matches the circumferential direction around the center axis of the disk 110. Another example is a linear type encoder, in which the measurement target is a linear scale and a rotor moves relative to a stator. In this case, the measurement direction is a direction along the linear scale. As used herein, the term "center axis" refers to the rotational axis of the disk 110. When the disk 110 is coaxially coupled to the shaft SH, the center axis matches the axis AX of the shaft (SH).

The slit track (STI) has a form of a ring around the disk center (O). The slit track (STI) includes multiple reflection slits (SI) arranged throughout the track along the measurement direction (C), forming an incremental pattern in the measurement direction (C). The term "incremental pattern" refers to a pattern of regular repetition of slits at a predetermined pitch (arrangement intervals). The incremental pattern of the slit track (STI) indicates a relative position of the motor (M) on a one-pitch basis or within one pitch in the form of a sum of electrical signals from at least one of the light-receiving elements of the light-receiving array (PI), described later.

The slit track (STO) has a form of a ring around the disk center (O) and is disposed further outward than the slit track (STI). The slit track (STO) includes a single reflection slit (SO). The reflection slit (SO) is formed within a predetermined rotational angle on the track to correspond to the origin position of the motor (M).

The slit tracks (STU, STV, STW) each have a form of a ring around the disk center (O), and are formed at different radial positions that are further inward than the slit track (STI). In this example, the slit track (STU), the slit track (STV), and the slit track (STW) are concentrically formed in this order from the outer side toward the inner side.

The slit track (STU) includes a single reflection slit (SU). The reflection slit (SU) is formed within a rotational angle range of approximately 180 degrees on the track to correspond to a U-phase magnetic-pole position of the motor (M).

The slit track (STV) includes a single reflection slit (SV). The reflection slit (SV) is formed within a rotational angle range of approximately 180 degrees on the track while being offset from the rotational angle of the reflection slit (SU) by approximately 120 degrees in the measurement direction (C), to correspond to a V-phase magnetic-pole position of the motor (M).

The slit track (STW) includes a single reflection slit (SW). The reflection slit (SW) is formed within a rotational angle range of approximately 180 degrees on the track while being offset from the rotational angle of the reflection slit (SV) by approximately 120 degrees in the measurement direction (C), to correspond to a W-phase magnetic-pole position of the motor (M).

Each of the reflection slits (SI, SO, SU, SV, SW) reflects light emitted from a light source 121, described later.

The disk 110 is made of a light reflecting material such as metal. For a non-light-reflecting portion of the upper surface of the disk 110, a material of low reflectance (for example, chromic oxide) is disposed by a method such as application. Thus, the reflection slits are formed at other portions than where the low reflectance material is. It is also possible to form the reflection slits by making the non-light-reflecting portion a coarse surface by sputtering or a similar method to ensure low reflectance.

There is no particular limitation to the material of the disk 110 and the method of preparing the disk 110. An exemplary material of the disk 110 is a light transmitting material such as glass and transparent resin. In this case, the reflection slits may be formed by mounting a light reflecting material (such as aluminum) on the upper surface of the disk 110 by deposition or another method.

1-2-2. Optical Module

The optical module 120 has a form of a single substrate (BA) in parallel with the disk 110. This ensures a thinner form of the encoder 100 and simplified production of the optical module 120. The substrate (BA) is fixed while facing part of the slit tracks (STI, STO, STU, STV, STW) of the disk 110. Thus, together with the rotation of the disk 110, the optical module 120 moves relative to the slit tracks (STI, STO, STU, STV, STW) of the disk 110 in the measurement direction (C). The optical module 120 may not necessarily have a form of a single substrate (BA); the components of the optical module 120 may be multiple substrates insofar as these substrates are concentrated. The optical module 120 may not have a form of a substrate.

On the lower surface of the substrate (BA) facing the disk 110, the optical module 120 includes the light source 121, the light-receiving array (PI), and four light-receiving elements (PO, PU, PV, PW).

1-2-2-1. Light Source

In this example, the light source 121 is disposed at a position to face part of the slit track (STI). The light source 121 radiates light to part of the slit tracks (STI, STO, STU, STV, STW) (hereinafter occasionally referred to as "irradiated area") of the disk 110 passing through the position facing the optical module 120.

There is no particular limitation to the light source 121 insofar as the light source 121 is capable of radiating light to the irradiated area. An example is a light emitting diode (LED). In this embodiment, the light source 121 is formed as a point light source, where no optical lens or like element is particularly disposed, and emits diffused light from a light emitting portion. By the term "point light source", it is not necessarily meant to be an accurate point. It will be appreciated that light can be emitted from a finite surface of a light source insofar as the light source is taken as one capable of emitting diffused light from an approximately pointed position in design viewpoints or in operation principle viewpoints. The term "diffused light" is not necessarily be light emitted in every direction from the point light source. The diffused light encompasses light emitted and diffused in a limited direction. That is, the diffused light encompasses any light that is more diffusible than parallel light. The use of a point optical source in this manner ensures that the light source 121 radiates diffused light to the irradiated area, thereby uniformly radiating light to the irradiated area, even though the light source 121 is more or less influenced by occurrences such as: a change in amount of light due to displacement from the optical axis; and attenuation due to an optical-path length difference. Additionally, no concentration or diffusion of light is performed by an optical element, and this makes an error or like occurrences by the optical element less likely to occur, and increases straightness of the radiated light to the irradiated area.

1-2-2-2. Light-Receiving Array and Light-Receiving Element

The light-receiving array (PI) and the light-receiving elements (PO, PU, PV, PW) are disposed around the light source 121.

The light-receiving array (PI) includes multiple light-receiving elements (not shown) arranged in the form of an array at a predetermined pitch along a direction corresponding to the measurement direction (C). Each of the light-receiving elements of the light-receiving array (PI) receives light emitted from the light source 121 and reflected by the reflection slit (SI) of the slit track (STI), converts the received light into an electrical signal, and outputs the electrical signal.

In the light-receiving array (PI) according to this embodiment, a set of four light-receiving elements 123 in total is arranged in one pitch of the incremental pattern (one pitch as seen in an image projected on the optical module 120) of the slit track (STI), and other multiple sets of four light-receiving elements 123 each are further arranged in a direction corresponding to the measurement direction (C). Since the incremental pattern of the slit track (STI) is a repetition of the reflection slits (SI) formed on a one-pitch basis, the light-receiving elements 123 of the light-receiving array (PI) each generate an electrical signal that is a periodic signal having one period (referred to as 360 degrees in electrical angle) for one pitch when the disk 110 rotates. Also, since four light-receiving elements 123 are disposed in one set, which corresponds to one pitch, adjacent light-receiving elements 123 in one set generate electrical signals that are phase-shifted with respect to each other by 90 degrees.

The incremental pattern of the slit track (STI) indicates a relative position of the motor (M) per pitch or within one pitch, and the electrical signals of the different phases in one set each exhibit a value that changes in a similar manner with respect to the corresponding one of the electrical signals of the different phases in another set. Thus, the electrical signals of the same phases are added together across the multiple sets. Thus, four electrical signals that are phase-shifted with respect to each other by 90 degrees are generated from the multiple light-receiving elements of the light receiving array (PI). These electrical signals are occasionally referred to as "A-phase signal", "B-phase signal (which has a phase difference of 90 degrees relative to the A-phase signal)", "A-bar-phase signal (which has a phase difference of 180 degrees relative to the A-phase signal)", and "B bar phase signal (which has a phase difference of 180 degrees relative to the B-phase signal)". Also, these electrical signals are occasionally collectively referred to as "incremental signal". The incremental signal output from each of the light-receiving elements of the light-receiving array (PI) is acquired by a relative position detector 1312, described later, of the control device 130 and used to detect the relative position of the motor (M). That is, the light reflected by each reflection slit (SI) of the slit track (STI) is an example of the signal corresponding to the relative position of the motor. Each light-receiving element of the light-receiving array (PI) is an example of the incremental detection sensor.

While in this embodiment four light-receiving elements are arranged in a single set of light-receiving array (PI), there is no particular limitation to the number of the light-receiving elements in a single set of light-receiving array (PI). An example is that two light-receiving elements are arranged in a single set of light-receiving array (PI).

The light-receiving element (PO) receives the light emitted from the light source 121 and reflected by the reflection slit (SO), converts the received light into an electrical signal, and outputs the electrical signal. Thus, the light-receiving element (PO) generates one pulse of electrical signal per rotation of the disk 110. This electrical signal is occasionally referred to as "origin signal" or "Z-phase signal". The origin signal output from the light-receiving element (PO) is acquired by an origin position detector 1313, described later, of the control device 130 and used to detect the origin position of the motor (M). Specifically, the light reflected by the reflection slit (SO) is an example of the signal corresponding to the origin position of the motor. The light-receiving element (PO) is an example of the origin detection sensor.

The light-receiving element (PU) receives the light emitted from the light source 121 and reflected by the reflection slit (SU), converts the received light into an electrical signal, and outputs the electrical signal. The light-receiving element (PV) receives the light emitted from the light source 121 and reflected by the reflection slit (SV), converts the received light into an electrical signal, and outputs the electrical signal. The light-receiving element (PW) receives the light emitted from the light source 121 and reflected by the reflection slit SW, converts the received light into an electrical signal, and outputs the electrical signal. Specifically, when the disk 110 rotates, the light-receiving elements (PU, PV, PW) generate periodic electrical signals having phase differences of 120 degrees relative to each other. Each electrical signal has one period per rotation of the disk 110. In the following description, the electrical signals respectively generated by the light-receiving elements (PU, PV, PW) are occasionally referred to as "U-phase signal", "V-phase signal (which has a phase difference of 120 degrees relative to the U-phase signal)", and "W-phase signal (which has a phase difference of 120 degrees relative to the V-phase signal)". The U-phase signal, the V-phase signal, and the W-phase signal respectively output from the light-receiving elements (PU, PV, PW) are acquired by a magnetic-pole detector 1311, described later, of the control device 130 and used to detect the magnetic-pole positions of three phases (U phase, V phase, and W phase) of the motor (M). Specifically, the light reflected by the reflection slits (SU, SV, SW) is an example of the signals corresponding to the magnetic-pole position of the motor. The light-receiving elements (PU, PV, PW) each are an example of the magnetic-pole detection sensor.

There is no particular limitation to the light-receiving elements of the light-receiving array (PI) and the light-receiving elements (PO, PU, PV, PW), insofar as the light emitted from the light source 121 and reflected by a corresponding one of the reflection slits is received and converted into an electrical signal. An example is a photodiode.

1-2-3. Control Device

A structure of the control device 130 according to this embodiment will be described by referring to FIG. 5.

Figure 5:
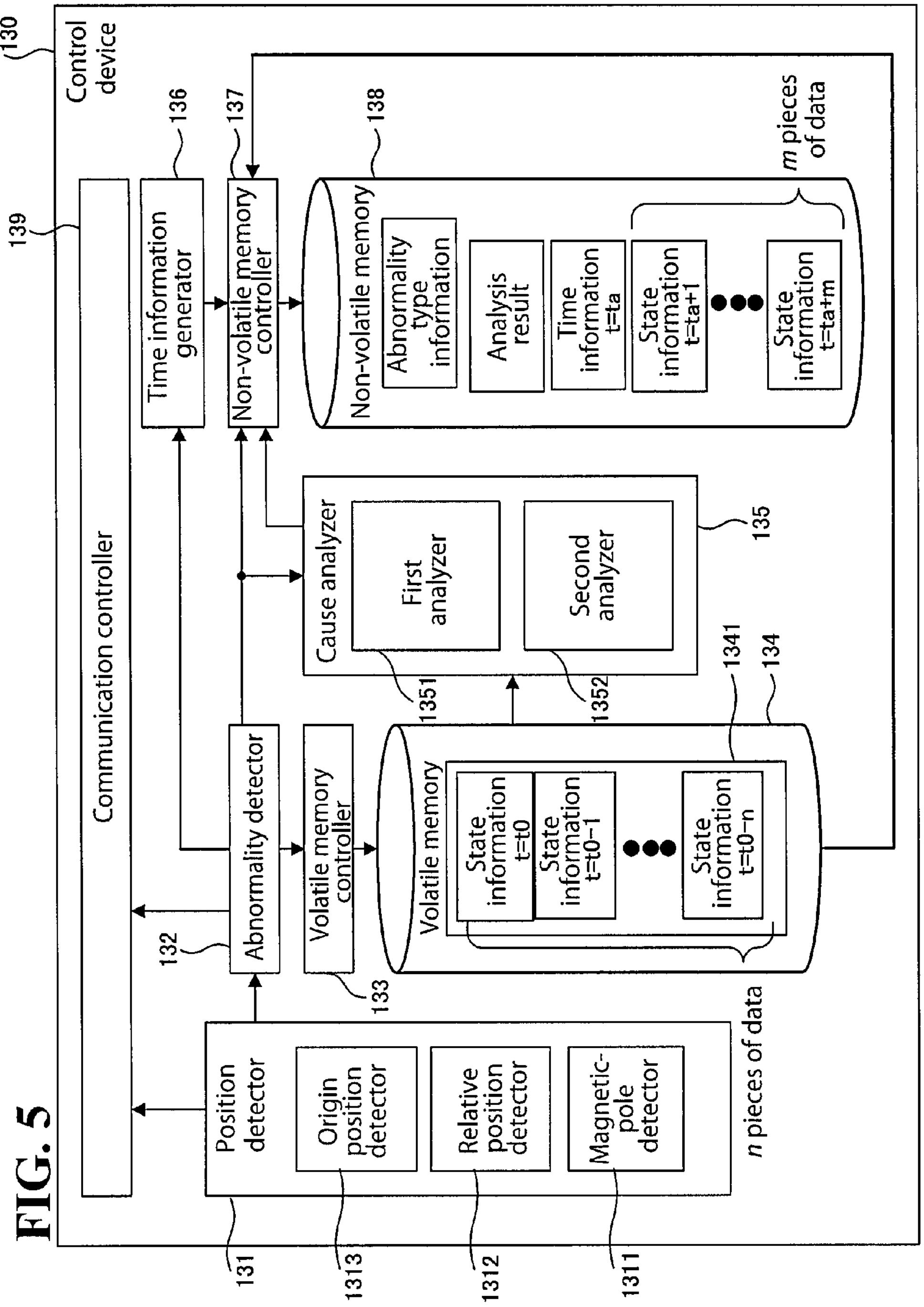
FIG. 5 is a diagram illustrating a structure of a control device according to the first embodiment.

As shown in FIG. 5, the control device 130 includes a position detector 131, an abnormality detector 132, a volatile memory controller 133, a volatile memory 134, a cause analyzer 135, a time information generator 136, a non-volatile memory controller 137, a non-volatile memory 138, and a communication controller 139.

The position detector 131 detects the position of the motor (M). Specifically, the position detector 131 includes the magnetic-pole detector 1311, the relative position detector 1312, and the origin position detector 1313.

The magnetic-pole detector 1311 detects the three-phase (U-phase, V-phase, and W-phase) magnetic-pole positions of the motor (M) based on the U-phase signal, the V-phase signal, and the W-phase signal respectively output from the light-receiving elements (PU, PV, PW). Specifically, the magnetic-pole detector 1311 acquires the U-phase signal, the V-phase signal, and the W-phase signal respectively from the light-receiving elements (PU, PV, PW) at the timing when the magnetic-pole detector 1311 measures the magnetic-pole positions of the motor (M). Then, the magnetic-pole detector 1311 detects the magnetic-pole positions of the motor (M) indicated by the acquired U-phase signal, V-phase signal, and W-phase signal. There is no particular limitation to the method of detecting the magnetic-pole positions of the motor (M) for the magnetic-pole detector 1311. An example of the method is as follows.

The magnetic-pole detector 1311 amplifies the acquired U-phase signal, V-phase signal, and W-phase signal and converts the signals into digital signals. Then, the magnetic-pole detector 1311 detects the magnetic-pole positions of the motor (M) using the three signals (hereinafter occasionally referred to as "U-phase digital signal", "V-phase digital signal", and "W-phase digital signal") resulting from the digital conversion. There is no particular limitation to the method of detecting the magnetic-pole positions of the motor (M). An example of the detection method is to convert the U-phase digital signal, the V-phase digital signal, and the W-phase digital signal into electrical angles $\phi$ using a tracking circuit. Another example of the detection method is to use a table prepared in advance to identify electrical angles $\phi$ respectively associated with values of the U-phase digital signal, the V-phase digital signal, and the W-phase digital signal.

These methods of detecting the magnetic-pole positions of the motor (M) for the magnetic-pole detector 1311 are provided for exemplary purposes; it is possible to use any other method.

The position detector 131 generates position data (hereinafter occasionally referred to as "first position data") indicating the magnetic-pole positions of the motor (M) detected by the magnetic-pole detector 1311. Then, the position detector 131 outputs the first position data to the communication controller 139. The communication controller 139 outputs the received first position data to the controller (CT).

The position detector 131 outputs to the abnormality detector 132 the first position data and data (hereinafter occasionally referred to as "magnetic-pole position related data") including data corresponding to the U-phase signal, data corresponding to the V-phase signal, and data corresponding to the W-phase signal.

The relative position detector 1312 detects the relative position of the motor (M) based on the incremental signals output from the light-receiving elements of the light-receiving array (PI). Specifically, at the timing when the relative position detector 1312 detects the relative position of the motor (M), the relative position detector 1312 acquires four incremental signals that are phase-shifted with respect to each other by 90 degrees from the light-receiving elements of the light-receiving array (PI). Then, the relative position detector 1312 detects the relative position of the motor (M) indicated by the acquired four incremental signals. There is no particular limitation to the method of detecting the relative position of the motor (M) for the relative position detector 1312. An example of the method is as follows.

The relative position detector 1312 amplifies the difference between incremental signals, among the acquired four incremental signals, that have a phase difference of 180 degrees. Amplifying the difference between the incremental signals having a phase difference of 180 degrees ensures offset of a production error, a measurement error, and another error among the reflection slits (SI) within a single pitch. The two signals resulting from the differential amplification (such signals are hereinafter occasionally referred to as "first incremental signal" and "second incremental signal") have a phase difference of 90 degrees. Then, the relative position detector 1312 converts the first incremental signal and the second incremental signal, which result from the differential amplification, into digital signals. The relative position detector 1312 detects the relative position of the motor (M) within a single pitch using the two signals (such signals are hereinafter occasionally referred to as "first digital signal" and "second digital signal") resulting from the digital conversion. There is no particular limitation to the method of detecting the relative position of the motor (M) within a single pitch. An example of the detection method is to obtain an electrical angle ($\phi$) through arctan operation of a quotient of the first digital signal and the second digital signal. Another example of the detection method is to convert the first digital signal and the second digital signal into electrical angles ($\phi$) using a tracking circuit. Another example of the detection method is to use a table prepared in advance to identify electrical angles ($\phi$) associated with values of the first digital signal and the second digital signal.

These methods of detecting the relative position of the motor (M) performed by the relative position detector 1312 are provided for exemplary purposes; it is possible to use any other method.

The origin position detector 1313 detects the origin position of the motor (M) based on the origin signal output from the light-receiving element (PO). Specifically, the origin position detector 1313 acquires the origin signal from the light-receiving element (PO) at the timing when the origin position detector 1313 measures the origin position of the motor (M). Then, the origin position detector 1313 detects the origin position of the motor (M) indicated by the acquired origin signal.

The position detector 131 detects the absolute position of the motor (M) based on the relative position of the motor (M) detected by the relative position detector 1312 and the origin position of the motor (M) detected by the origin position detector 1313. Then, the position detector 131 generates position data (hereinafter occasionally referred to as "second position data") indicating the detected absolute position of the motor (M). The position detector 131 outputs the second position data to the communication controller 139. The communication controller 139 outputs the received second position data to the controller (CT).

The position detector 131 outputs to the abnormality detector 132 the second position data and data including data corresponding to the incremental signal and data corresponding to the origin signal (hereinafter occasionally referred to as "first absolute position related data").

The abnormality detector 132 detects an abnormality related to the encoder 100 and/or the motor (M) based on state information. Specifically, the abnormality detector 132 acquires the state information at the timing when the abnormality detector 132 monitors an abnormality related to the encoder 100 and/or the motor (M). There is no particular limitation to the abnormality monitored by the abnormality detector 132 insofar as the abnormality relates to the encoder 100 and/or the motor (M). Examples of the abnormality monitored by the abnormality detector 132 include an abnormality related to the magnetic-pole position of the motor (M), an abnormality related to the absolute position of the motor (M), an abnormality related to a temperature of the encoder 100, and an abnormality related to a temperature of the motor (M). For convenience of description, in the following description, the abnormality monitored by the abnormality detector 132 is the abnormality related to the magnetic-pole position of the motor (M) and the abnormality related to the absolute position of the motor (M).

The term “state information” indicates a state of the encoder 100 and/or the motor (M), and by nature, constantly changes while the servomotor (SM) is in operation. There is no particular limitation to the state information insofar as the state information indicates a state of the encoder 100 and/or the motor (M). In this embodiment, the abnormality monitored by the abnormality detector 132 is the abnormality related to the magnetic-pole position of the motor (M) and the abnormality related to the absolute position of the motor (M). In this case, the abnormality detector 132 acquires the following state information.

At the timing when the abnormality detector 132 monitors the abnormality related to the magnetic-pole position of the motor (M), the abnormality detector 132 acquires the first position data and the magnetic-pole position related data as the state information from the position detector 131. Here, based on the acquired first position data and magnetic-pole position related data, the abnormality detector 132 determines whether a predetermined detection condition is satisfied so as to detect the abnormality related to the magnetic-pole position of the motor (M). There is no particular limitation to the method of detecting the abnormality related to the magnetic-pole position of the motor (M) for the abnormality detector 132. An example of the method is as follows.

Figure 6A:
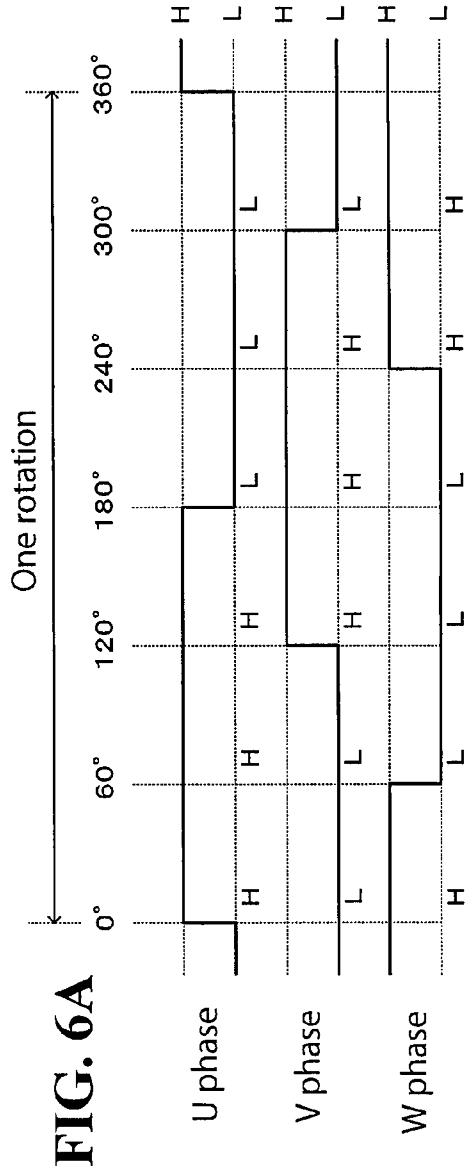
FIG. 6A is a diagram illustrating an exemplary abnormality detection method according to the first embodiment for an abnormality detector in relation to magnetic-pole positions of a motor.
Figure 6B:
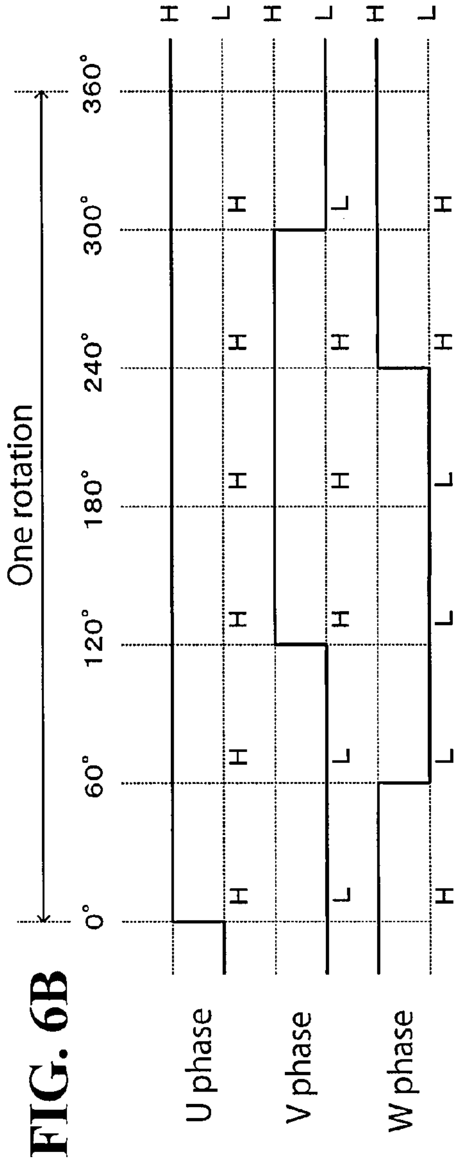
FIG. 6B is a diagram illustrating an exemplary abnormality detection method according to the first embodiment for the abnormality detector in relation to the magnetic-pole positions of the motor.

FIGS. 6A and 6B show exemplary waveforms of a digital signal (U-phase digital signal) corresponding to the U-phase signal, a digital signal (V-phase digital signal) corresponding to the V-phase signal, and a digital signal (W-phase digital signal) corresponding to the W-phase signal. FIG. 6A shows the waveforms in normal state, while FIG. 6B shows the waveforms in abnormal state. In this example, the U-phase digital signal, the V-phase digital signal, and the W-phase digital signal each are at “H” level when the corresponding light-receiving element receives light, and at “L” level when the corresponding light-receiving element receives no light. Also in this example, the level of the digital signal corresponding to each phase is monitored every time the disk 110 is rotated by 60 degrees. As shown in FIG. 6A, in normal state, all the U-phase digital signal, the V-phase digital signal, and the W-phase digital signal will not be at the same level at the same time (all the signals will not be at “H” level or “L” level). As shown in FIG. 6B, in abnormal state, all the U-phase digital signal, the V-phase digital signal, and the W-phase digital signal may be at the same level at the same time (in this example, all the signals are at “H” level at the time when the disk 110 is rotated by 240 degrees).

Based on the acquired magnetic-pole position related data, the abnormality detector 132 checks the levels of the U-phase digital signal, the V-phase digital signal, and the W-phase digital signal at multiple predetermined time intervals (for example, every time the disk 110 is rotated by 60 degrees). Thus, the abnormality detector 132 determines whether all the U-phase digital signal, the V-phase digital signal, and the W-phase digital signal are at the same level at the same time. When all the U-phase digital signal, the V-phase digital signal, and the W-phase digital signal are at the same level at the same time, the abnormality detector 132 detects the abnormality related to the magnetic-pole position of the motor (M).

The above-described method of detecting the abnormality related to the magnetic-pole position of the motor (M) performed by the abnormality detector 132 is provided for exemplary purposes; it is possible to use any other method.

At the timing when the abnormality detector 132 monitors the abnormality related to the absolute position of the motor (M), the abnormality detector 132 acquires the second position data and the first absolute position related data as the state information from the position detector 131. Here, based on the second position data and the first absolute position related data, the abnormality detector 132 determines whether a predetermined detection condition is satisfied so as to detect the abnormality related to the absolute position of the motor (M). There is no particular limitation to the method of detecting the abnormality related to the absolute position of the motor (M) for the abnormality detector 132. An example of the method is as follows.

In normal state, when the pulse detection count of the incremental signal from the pulse detection time of the origin signal is similar to the number of the reflection slits (SI) of the slit track (STI), a pulse of the next origin signal is detected. In abnormal state, the pulse of the next origin signal may be detected when the pulse detection count of the incremental signal from the pulse detection time of the origin signal is smaller than the number of the reflection slits (SI) of the slit track (STI) or larger than the number of the reflection slits (SI) of the slit track (STI). For example, the number of the reflection slits (SI) is 512. In normal state, the pulse of the next origin signal is detected when the pulse detection count of the incremental signal from the pulse detection time of the origin signal is 512. In abnormal state, the pulse of the next origin signal may be detected when the pulse detection count of the incremental signal from the pulse detection time of the origin signal is smaller than 512 or larger than 513.

In view of this, the abnormality detector 132 detects the pulse of the incremental signal and the pulse of the origin signal based on the acquired first absolute position related data. Then, the abnormality detector 132 determines whether the pulse of the next origin signal is detected when the pulse detection count of the incremental signal from the pulse detection time of the origin signal is smaller than the number of reflection slits (SI) or the pulse detection count is in excess of the number of the reflection slits (SI). The abnormality detector 132 detects the abnormality related to the absolute position of the motor (M) in the case where the pulse of the next origin signal is detected when the pulse detection count of the incremental signal from the pulse detection time of the origin signal is smaller than the number of reflection slits (SI), or in the case where the pulse detection count is in excess of the number of the reflection slits (SI).

The above-described method of detecting the abnormality related to the absolute position of the motor (M) performed by the abnormality detector 132 is provided for exemplary purposes; it is possible to use any other method.

Then, to the volatile memory controller 133, the abnormality detector 132 sequentially outputs the state information used to monitor the abnormality related to the magnetic-pole position of the motor (M) and the state information used to monitor the abnormality related to the absolute position of the motor (M).

The volatile memory controller 133 stores the state information in the volatile memory 134. Specifically, when the volatile memory controller 133 receives the state information from the abnormality detector 132, the volatile memory controller 133 stores the state information in the volatile memory 134. Here, the volatile memory controller 133 stores the state information in a predetermined storage area 1341 in the volatile memory 134. Specifically, the volatile memory controller 133 stores pieces of the state information corresponding to n (multiple) points of time until the storage area 1341 is full. Once the storage area 1341 is full, the volatile memory controller 133 overwrites a piece of the state information corresponding to an oldest point of time with another piece of the state information corresponding to a latest point of time. The volatile memory controller 133 may not necessarily store the state information in the storage area 1341 of the volatile memory 134; it is possible to store the state information elsewhere in the volatile memory 134. Still, in the following description, the volatile memory controller 133 stores the state information in the storage area 1341 of the volatile memory 134 for convenience of description.

The storage area 1341 stores pieces of the state information corresponding to n points of time, t=t0−(n+1) to t0−1, for instance. The n points of time, t=t0−(n+1) to t0−1, are from the point of time t=t0−(n+1) to the point of time t=t0−1. In this case, in storing the piece of the state information corresponding to the latest point of time t=t0 in the storage area 1341, the volatile memory controller 133 overwrites the piece of the state information corresponding to the oldest point of time t=t0−(n+1) with the piece of the state information corresponding to the latest point of time t=t0. Thus, the storage area 1341 stores the pieces of the state information corresponding to the n points of time, t=t0−n to t0, which are from the point of time t=t0−n to the point of time t=t0 (see FIG. 5).

The state information stored in the volatile memory 134 is erased when the power source of the encoder 100 is turned OFF.

Upon detecting any one of the abnormality related to the magnetic-pole position of the motor (M) and the abnormality related to the absolute position of the motor (M), the abnormality detector 132 outputs a signal (hereinafter occasionally referred to as "alarm signal") to the communication controller 139 and the cause analyzer 135. The signal indicates that the abnormality has been detected. Here, the abnormality detector 132 outputs the alarm signal not only to the communication controller 139 and the cause analyzer 135, but also to the non-volatile memory controller 137 and the time information generator 136. Insofar as the abnormality detector 132 outputs the alarm signal to the communication controller 139 and the cause analyzer 135, the abnormality detector 132 may not necessarily output the alarm signal to the non-volatile memory controller 137 and/or the time information generator 136. When no alarm signal is output to the time information generator 136, the time information generator 136 may be omitted. Still, in the following description, the abnormality detector 132 outputs the alarm signal not only to the communication controller 139 and the cause analyzer 135, but also to the non-volatile memory controller 137 and the time information generator 136 for convenience of description. The communication controller 139 outputs the received alarm signal to the controller (CT). Some of the alarm signals that the abnormality detector 132 outputs to these elements include information (hereinafter occasionally referred to as "abnormality type information") indicating the type of abnormality detected by the abnormality detector 132. Specifically, the alarm signals output at least to the non-volatile memory controller 137 and the cause analyzer 135 include the abnormality type information.

The time information generator 136 generates time information of the point of time t=ta, at which the abnormality detector 132 detects the abnormality. Specifically, when the time information generator 136 receives the alarm signal from the abnormality detector 132, the time information generator 136 generates the time information of the point of time t=ta, which is the time of abnormality detection. Then, the time information generator 136 outputs the time information to the non-volatile memory controller 137.

When the abnormality detector 132 detects the abnormality, the cause analyzer 135 analyzes the state information to identify the cause of the abnormality. Specifically, when the cause analyzer 135 receives the alarm signal from the abnormality detector 132, the cause analyzer 135 analyzes the state information stored in the storage area 1341 of the volatile memory 134 to identify the cause of the abnormality indicated by the alarm signal. More specifically, when the cause analyzer 135 receives the alarm signal from the abnormality detector 132, the cause analyzer 135 acquires the state information stored in the storage area 1341 of the volatile memory 134, stores the state information in another storage area of the volatile memory 134, and analyzes the state information stored in the other storage area to identify the cause of the abnormality indicated by the alarm signal. Here, the cause analyzer 135 may identify the cause of the abnormality by analyzing a piece of the state information corresponding to the time before the point of time t=ta, which is the time of abnormality detection. It is also possible for the cause analyzer 135 to identify the cause of the abnormality by analyzing pieces of the state information corresponding to the time before and after the point of time t=ta, which is the time of abnormality detection. In the following description, the cause analyzer 135 identifies the cause of the abnormality by analyzing the pieces of the state information corresponding to the time before and after the point of time t=ta, which is the time of abnormality detection, for convenience of description. The cause analyzer 135 includes a first analyzer 1351 and a second analyzer 1352.

The first analyzer 1351 uses the U-phase signal, the V-phase signal, and the W-phase signal respectively output from the light-receiving elements (PU, PV, PW) as the state information to identify an abnormal element from among the light-receiving elements (PU, PV, PW). Specifically, when the first analyzer 1351 receives the alarm signal indicating the abnormality related to the magnetic-pole position of the motor (M), the first analyzer 1351 identifies an abnormal element from among the light-receiving elements (PU, PV, PW) based on the state information, which is the magnetic-pole position related data stored in the volatile memory 134. There is no particular limitation to the identification method for the first analyzer 1351. An example of the method is as follows.

As shown in FIG. 6B, the levels of the digital signals corresponding to normal light-receiving elements among the light-receiving elements (PU, PV, PW) (such digital signals are the V-phase digital signal and the W-phase digital signal in this example) change at every mechanical angle of 180 degrees. In contrast, the level of the digital signal corresponding to an abnormal light-receiving element among the light-receiving elements (PU, PV, PW) (such digital signal is the U-phase digital signal in this example) may not necessarily change at every mechanical angle of 180 degrees.

In view of this, based on the magnetic-pole position related data stored in the volatile memory 134, the first analyzer 1351 detects a change in the level of the U-phase digital signal, a change in the level of the V-phase digital signal, and a change in the level of the W-phase digital signal. When the first analyzer 1351 detects a light-receiving element whose corresponding digital signal does not change in level at every mechanical angle of 180 degrees, then the first analyzer 1351 identifies this light-receiving element as abnormal.

The above-described identification method for the first analyzer 1351 is provided for exemplary purposes; it is possible to use any other method.

The second analyzer 1352 uses the incremental signals output from the light-receiving elements of the light-receiving array (PI) and the origin signal output from the light-receiving element (PO) as the state information to identify an abnormal element from among the light-receiving elements of the light-receiving array (PI) and the light-receiving element (PO). Specifically, when the second analyzer 1352 receives the alarm signal indicating the abnormality related to the absolute position of the motor (M), the second analyzer 1352 identifies an abnormal element from among the light-receiving elements of the light-receiving array (PI) and the light-receiving element (PO) based on the state information, which is the first absolute position related data stored in the volatile memory 134. There is no particular limitation to the identification method for the second analyzer 1352. An example of the method is as follows.

When a light-receiving element of the light-receiving array (PI) is abnormal, and when the pulse detection count of the incremental signal from the pulse detection time of the origin signal is smaller than the number of reflection slits (SI) of the slit track (STI), the pulse of the next origin signal may be detected. When the light-receiving element PO is abnormal, the pulse detection count of the incremental signal from the pulse detection time of the origin signal may exceed the number of reflection slits (SI) of the slit track (STI).

In view of this, based on the first absolute position related data stored in the volatile memory 134, the second analyzer 1352 determines whether the pulse of the next origin signal is detected when the pulse detection count of the incremental signal from the pulse detection time of the origin signal is smaller than the number of reflection slits (SI) or the pulse detection count is in excess of the number of reflection slits (SI). When the second analyzer 1352 determines that the pulse of the next origin signal is detected when the pulse detection count of the incremental signal from the pulse detection time of the origin signal is smaller than the number of reflection slits (SI), the second analyzer 1352 identifies the light-receiving element of the light-receiving array (PI) as abnormal. When the second analyzer 1352 determines that the pulse detection count of the incremental signal from the pulse detection time of the origin signal is in excess of the number of reflection slits (SI), the second analyzer 1352 identifies the light-receiving element (PO) as abnormal.

The above-described identification method for the second analyzer 1352 is provided for exemplary purposes; it is possible to use any other method.

When the first analyzer 1351 performs its analysis, the cause analyzer 135 outputs a result of the analysis performed by the first analyzer 1351 to the non-volatile memory controller 137. When the second analyzer 1352 performs its analysis, the cause analyzer 135 outputs a result of the analysis performed by the second analyzer 1352 to the non-volatile memory controller 137.

The non-volatile memory controller 137 stores the result of the analysis performed by the cause analyzer 135 in the non-volatile memory 138. Specifically, the non-volatile memory controller 137 stores in the non-volatile memory 138 not only the result of the analysis but also one or more of the pieces of the state information corresponding to the points of time after t=ta, which is the time of abnormality detection, the time information of the point of time t=ta, which is the time of abnormality detection, and the abnormality type information. Insofar as the non-volatile memory controller 137 stores the result of the analysis in the non-volatile memory 138, the non-volatile memory controller 137 may not necessarily store in the non-volatile memory 138 one or more of the pieces of the state information corresponding to the points of time after t=ta, which is the time of abnormality detection, the time information of the point of time t=ta, which is the time of abnormality detection, and the abnormality type information. In the following description, the non-volatile memory controller 137 stores in the non-volatile memory 138 not only the result of the analysis but also one or more of the pieces of the state information corresponding to the points of time after t=ta, which is the time of abnormality detection, the time information of the point of time t=ta, which is the time of abnormality detection, and the abnormality type information, for convenience of description.

Specifically, when the non-volatile memory controller 137 receives the result of the analysis performed by the cause analyzer 135, the non-volatile memory controller 137 stores the result of the analysis in the non-volatile memory 138. When the non-volatile memory controller 137 receives the alarm signal from the abnormality detector 132, the non-volatile memory controller 137 stores in the non-volatile memory 138 the abnormality type information contained in the alarm signal. When the non-volatile memory controller 137 receives the alarm signal from the abnormality detector 132, the non-volatile memory controller 137 acquires the pieces of the state information corresponding to the points of time after t=ta, which is the time of abnormality detection, from the storage area 1341 of the volatile memory 134. Then, the non-volatile memory controller 137 sequentially stores the pieces of state information in the non-volatile memory 138. Here, the non-volatile memory controller 137 stores pieces of the state information corresponding to m points of time, t=ta+1 to ta+m. The m points of time, t=ta+1 to ta+m, are from the point of time t=ta+1, which is immediately after the point of time t=ta, which is the time of abnormality detection, to a predetermined point of time t=ta+m (such as a point of time at which the power source of the encoder 100 is turned OFF or a predetermined period of time). When the non-volatile memory controller 137 receives from the time information generator 136 the time information of the point of time t=ta, which is the time of abnormality detection, the non-volatile memory controller 137 stores the time information in the non-volatile memory 138.

The result of the analysis, the pieces of the state information corresponding to the points of time after t=ta, which is the time of abnormality detection, the time information of the point of time t=ta, which is the time of abnormality detection, and the abnormality type information are retained in the non-volatile memory controller 137 even after the power source of the encoder 100 is turned OFF.

Figure 7:
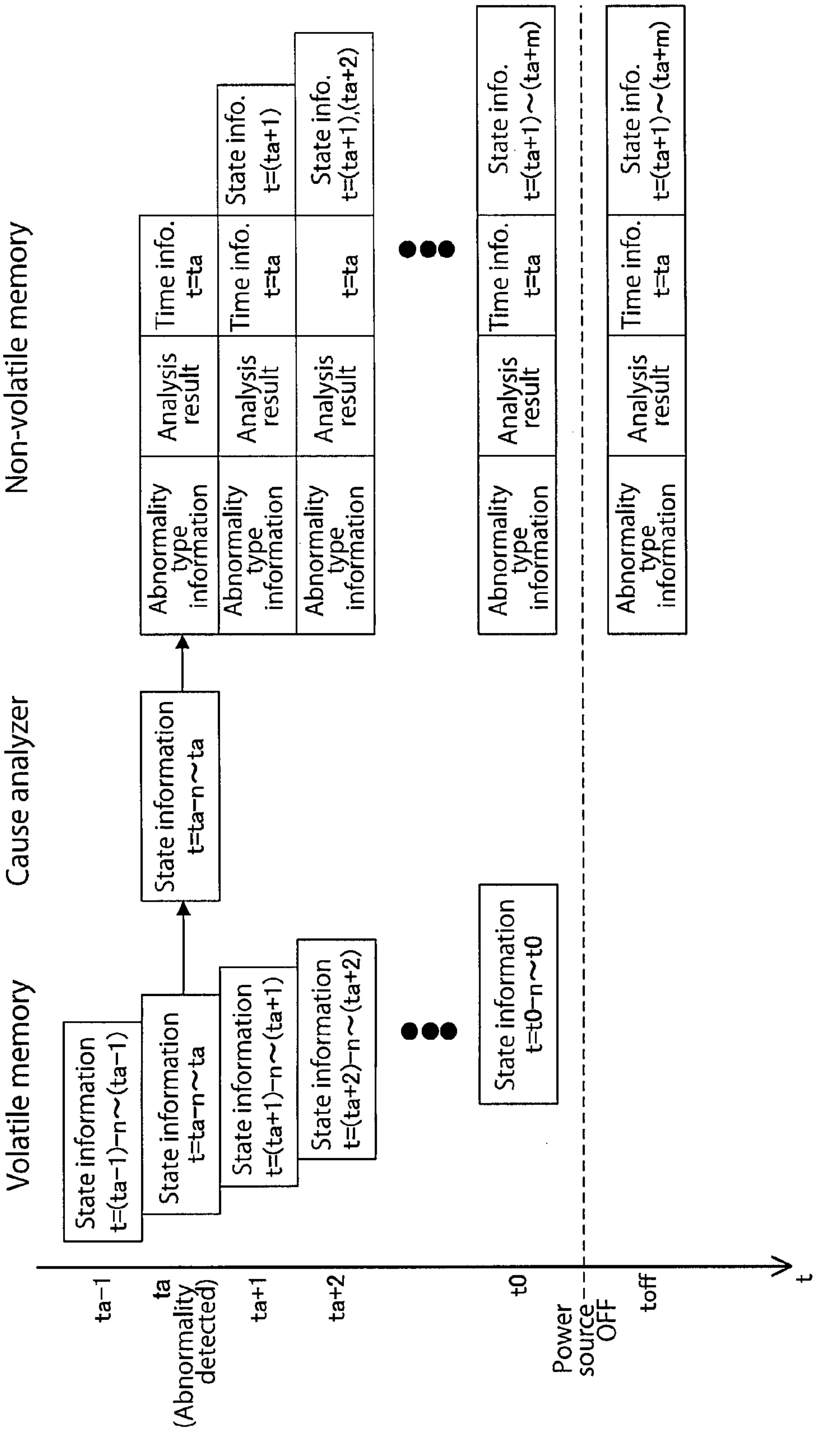
FIG. 7 is a diagram illustrating pieces of state information stored in a storage area of a volatile memory, pieces of state information used by a cause analyzer for analysis for a cause of an abnormality, and information stored in a non-volatile memory according to the first embodiment.
Figure 8:
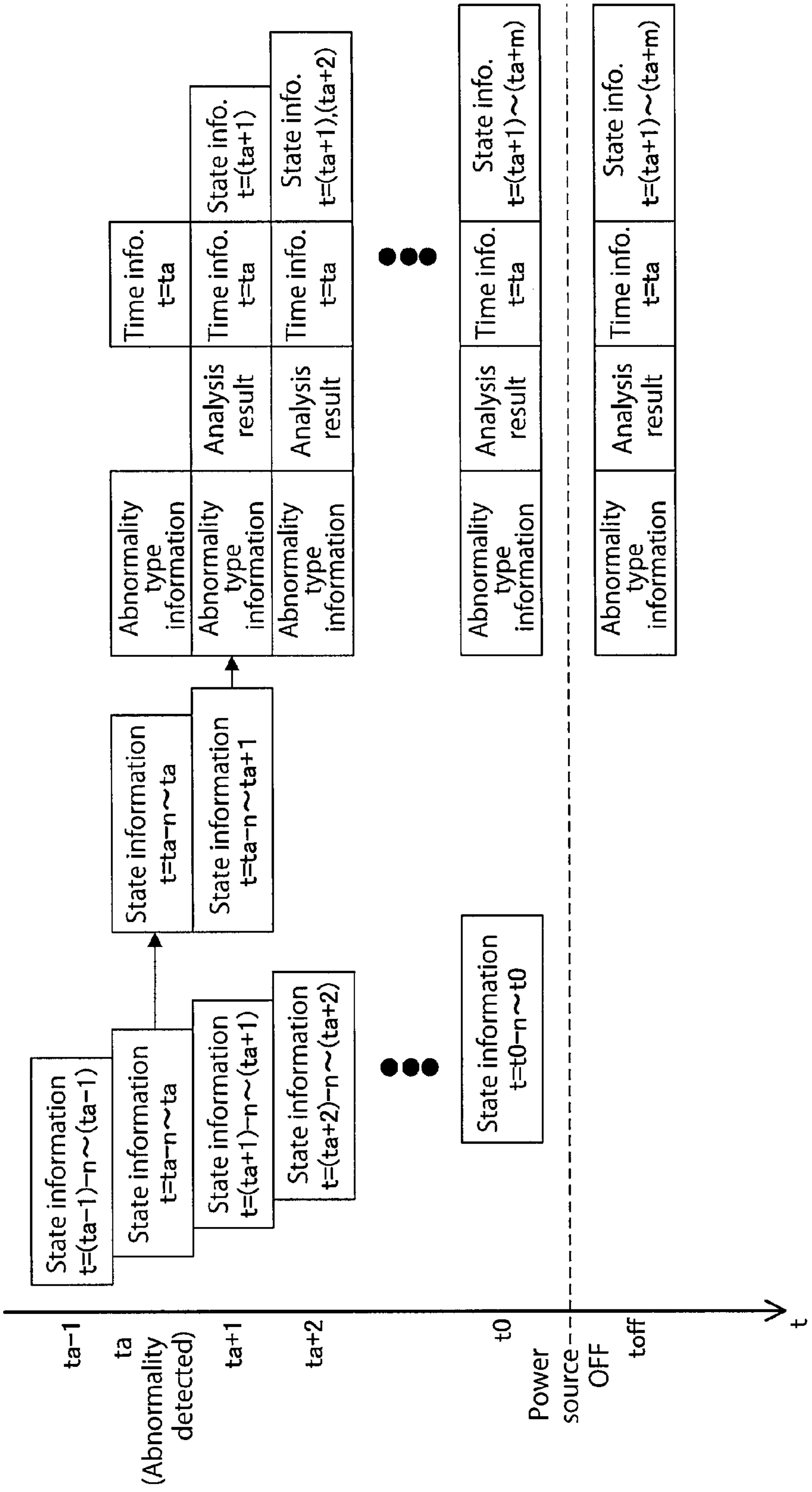
FIG. 8 is a diagram illustrating pieces of state information stored in the storage area of the volatile memory, pieces of state information used by the cause analyzer for analysis for the cause of the abnormality, and information stored in the non-volatile memory according to the first embodiment.

Referring to FIGS. 7 to 8, description will be made with regard to the state information stored in the storage area 1341 of the volatile memory 134, the state information that the cause analyzer 135 uses for abnormality analysis, and the information stored in the non-volatile memory 138. FIG. 7 shows an example in which the cause analyzer 135 identifies the cause of an abnormality by analyzing only pieces of the state information corresponding to the time before the point of time t=ta, which is the time of abnormality detection. FIG. 8 shows an example in which the cause analyzer 135 identifies the cause of the abnormality by analyzing the pieces of the state information corresponding to the time before and after the point of time t=ta, which is the time of abnormality detection.

In the example shown in FIG. 7, at a point of time t=ta−1, which is before abnormality detection the storage area 1341 of the volatile memory 134 stores pieces of the state information corresponding to a point of time t=(ta−1)−n through the point of time t=ta−1. At the point of time t=ta−1, none of the abnormality type information, the result of the analysis, the time information, and the state information is stored in the non-volatile memory 138.

Then, when the abnormality is detected at the next point of time t=ta, the storage area 1341 of the volatile memory 134 stores pieces of the state information corresponding to a point of time t=ta−n through the point of time t=ta. The cause analyzer 135 acquires the pieces of the state information corresponding to the points of time t=ta−n to ta stored in the storage area 1341 of the volatile memory 134 at the point of time t=ta, and stores the pieces of the state information in another storage area in the volatile memory 134. Then, the cause analyzer 135 identifies the cause of the abnormality by analyzing the pieces of the state information corresponding to the points of time t=ta−n to ta stored in the other storage area in the volatile memory 134. It will be assumed that the analysis for the cause of the abnormality has been successful at this point of time. Thus, at this point of time, the abnormality type information, the result of the analysis, and the time information of the point of time t=ta, which is the time of abnormality occurrence, are stored in the non-volatile memory 138.

At the next point of time t=ta+1, the volatile memory 134 stores pieces of the state information corresponding to a point of time t=(ta+1)−n through the point of time t=ta+1. At the point of time t=ta+1, the non-volatile memory 138 stores pieces of the state information corresponding to the point of time t=ta+1, which is after the point of time t=ta, which is the time of abnormality occurrence, in addition to the information already stored, namely, the abnormality type information, the result of the analysis, and the time information of the point of time t=ta, which is the time of abnormality occurrence.

At the next point of time t=ta+2, the volatile memory 134 stores pieces of the state information corresponding to a point of time t=(ta+2)−n through the point of time t=ta+2. At the point of time t=ta+2, the non-volatile memory 138 stores the abnormality type information, the result of the analysis, the time information of the point of time t=ta, which is the time of abnormality occurrence, and pieces of the state information corresponding to points of time t=(ta+1) and (ta+2), which are after the point of time t=ta, which is the time of abnormality occurrence.

At a point of time t=t0, the volatile memory 134 stores pieces of the state information corresponding to a point of time t=t0−n through the point of time t=t0. At the point of time t=t0, the non-volatile memory 138 stores the abnormality type information, the result of the analysis, the time information of the point of time t=ta, which is the time of abnormality occurrence, and pieces of the state information corresponding to points of time t=(ta+1) to (ta+m), which are after the point of time t=ta, which is the time of abnormality occurrence. It will be assumed that the power source of the encoder 100 is turned OFF at this point of time. In this case, the pieces of the state information corresponding to the point of time t=t0−n through the point of time t=t0 stored in the volatile memory 134 are erased.

At a point of time t=toff, at which the power source of the encoder 100 is OFF, the state information is not retained in the volatile memory 134. In contrast, the non-volatile memory 138 stores the abnormality type information, the result of the analysis, the time information of the point of time t=ta, which is the time of abnormality occurrence, and the pieces of state information corresponding to the points of time t=(ta+1) to (ta+m), which are after the point of time t=ta, which is the time of abnormality occurrence.

While in the above-described example the analysis for the cause of the abnormality is successful using the pieces of state information corresponding to the points of time t=ta−n to ta, the analysis for the cause of the abnormality may occasionally be unsuccessful using the pieces of state information corresponding to the points of time t=ta−n to ta. In this case, the cause analyzer 135 in the example shown in FIG. 7 does not identify the cause of the abnormality by analyzing the pieces of the state information corresponding to the points of time after t=ta, which is the time of abnormality detection. From then on, no analysis is conducted on the cause of the abnormality, either, and thus no result of analysis is stored in the non-volatile memory 138.

In the example shown in FIG. 8, at the point of time t=ta−1, which is before abnormality detection, the storage area 1341 of the volatile memory 134 stores the pieces of the state information corresponding to the point of time t=(ta−1)−n through the point of time t=ta−1, as in the example shown in FIG. 7. At the point of time t=ta−1, none of the abnormality type information, the result of the analysis, the time information, or the state information is stored in the non-volatile memory 138, as in the example shown in FIG. 7.

Then, when the abnormality is detected at the next point of time t=ta, the storage area 1341 of the volatile memory 134 stores pieces of the state information corresponding to a point of time t=ta−n through the point of time t=ta. The cause analyzer 135 acquires the pieces of the state information corresponding to the points of time t=ta−n to ta stored in the storage area 1341 of the volatile memory 134 at the point of time t=ta, and stores the pieces of state information in another storage area in the volatile memory 134. Then, the cause analyzer 135 identifies the cause of the abnormality by analyzing the pieces of the state information corresponding to the points of time t=ta−n to ta stored in the other storage area in the volatile memory 134. It will be assumed that the analysis for the cause of the abnormality is unsuccessful at this point of time. Thus, at this point of time, the abnormality type information and the time information of the point of time t=ta, which is the time of abnormality occurrence, are stored in the non-volatile memory 138.

At the next point of time t=ta+1, the volatile memory 134 stores pieces of the state information corresponding to a point of time t=(ta+1)−n through the point of time t=ta+1. The cause analyzer 135 acquires the piece of the state information corresponding to the point of time t=ta+1 stored in the storage area 1341 of the volatile memory 134 at the point of time t=ta+1, and stores the piece of state information in another storage area in the volatile memory 134. Then, the cause analyzer 135 identifies the cause of the abnormality by analyzing the pieces of the state information corresponding to the points of time t=ta−n to ta+1 stored in the other storage area in the volatile memory 134. It will be assumed that the analysis for the cause of the abnormality is successful at this point of time. Thus, at this point of time, the non-volatile memory 138 stores the result of the analysis and the piece of the state information corresponding to the point of time t=ta+1, which is after the point of time t=ta, which is the time of abnormality occurrence, in addition to the information already stored, namely, the abnormality type information and the time information of the point of time t=ta, which is the time of abnormality occurrence. The processing is otherwise similar to the processing in the example shown in FIG. 7.

1-3. Signal Processing Method for Encoder

A signal processing method for the encoder 100 according to this embodiment will be described by referring to FIG. 9.

Figure 9:
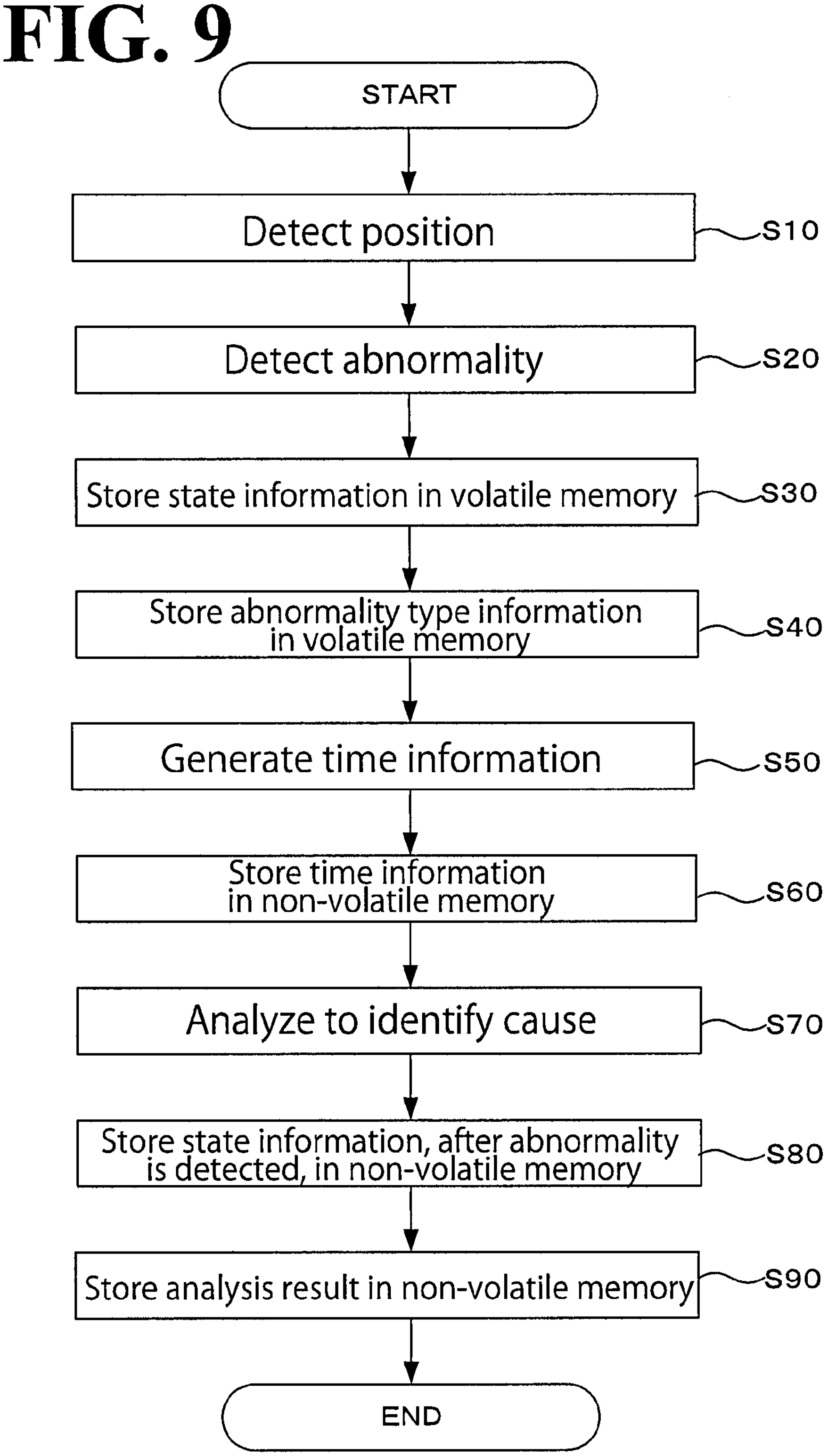
FIG. 9 is a diagram illustrating a signal processing method for the encoder according to the first embodiment.

As shown in FIG. 9, at step S10, based on the U-phase signal, the V-phase signal, and the W-phase signal respectively acquired from the light-receiving elements (PU, PV, PW), the magnetic-pole detector 1311 of the position detector 131 detects the magnetic-pole positions of the motor (M) indicated by the signals at the timing when the magnetic-pole detector 1311 measures the magnetic-pole positions of the motor (M). Based on the four incremental signals acquired from the light-receiving elements of the light-receiving array (PI), the relative position detector 1312 of the position detector 131 detects the relative position of the motor (M) indicated by the signals at the timing when the relative position detector 1312 measures the relative position of the motor (M). The origin position detector 1313 of the position detector 131 detects the origin position of the motor (M) indicated by the origin signal acquired from the light-receiving element (PO) at the timing when the origin position detector 1313 measures the origin position of the motor (M).

At step S20, based on the first position data and the magnetic-pole position related data acquired from the position detector 131, the abnormality detector 132 detects the abnormality related to the magnetic-pole position of the motor (M) at the timing when the abnormality detector 132 monitors the abnormality related to the magnetic-pole position of the motor (M). Also based on the second position data and the first absolute position related data acquired from the position detector 131, the abnormality detector 132 detects the abnormality related to the absolute position of the motor (M) at the timing when the abnormality detector 132 monitors the abnormality related to the absolute position of the motor (M). Then, to the volatile memory controller 133, the abnormality detector 132 sequentially outputs the state information used to monitor the abnormality related to the magnetic-pole position of the motor (M) and the state information used to monitor the abnormality related to the absolute position of the motor (M).

When at step S30 the volatile memory controller 133 receives the state information from the abnormality detector 132, the volatile memory controller 133 stores the state information in the storage area 1341 of the volatile memory 134. Specifically, the volatile memory controller 133 stores pieces of the state information corresponding to n points of time until the storage area 1341 is full. Once the storage area 1341 is full, the volatile memory controller 133 overwrites the piece of the state information corresponding to the oldest point of time with the piece of the state information corresponding to the latest point of time.

When at step S40 the non-volatile memory controller 137 receives the alarm signal from the abnormality detector 132, the non-volatile memory controller 137 stores in the non-volatile memory 138 the abnormality type information contained in the alarm signal.

When at step S50 the time information generator 136 receives the alarm signal from the abnormality detector 132, the time information generator 136 generates the time information of the point of time t=ta, which is the time of abnormality detection.

When at step S60 the non-volatile memory controller 137 receives the time information of the point of time t=ta, which is the time of abnormality detection, from the time information generator 136, the non-volatile memory controller 137 stores the time information in the non-volatile memory 138.

When at step S70 the cause analyzer 135 receives the alarm signal indicating the abnormality related to the magnetic-pole position of the motor (M), the first analyzer 1351 identifies an abnormal element from among the light-receiving elements (PU, PV, PW) based on the magnetic-pole position related data stored in the volatile memory 134. When the cause analyzer 135 receives the alarm signal indicating the abnormality related to the absolute position of the motor (M), the cause analyzer 135 identifies an abnormal element from among the light-receiving elements of the light-receiving array (PI) and the light-receiving element (PO) based on the first absolute position related data stored in the volatile memory 134.

When at step S80 the non-volatile memory controller 137 receives the alarm signal from the abnormality detector 132, the non-volatile memory controller 137 sequentially acquires the pieces of the state information corresponding to the points of time after t=ta, which is the time of abnormality detection, from the storage area 1341 of the volatile memory 134. Then, the non-volatile memory controller 137 sequentially stores the pieces of state information in the non-volatile memory 138.

When at step S90 the non-volatile memory controller 137 receives the result of the analysis performed by the cause analyzer 135, the non-volatile memory controller 137 stores the result of the analysis in the non-volatile memory 138. Thus, the processing shown in the flow is completed. The steps in the flow are repeated.

1-4. Exemplary Effects of this Embodiment

The encoder 100 according to this embodiment described above includes the abnormality detector 132, the cause analyzer 135, and the non-volatile memory controller 137. The abnormality detector 132 detects abnormalities related to the encoder 100 and to the motor (M) based on state information. When the abnormality detector 132 detects an abnormality, the cause analyzer 135 analyzes the state information to identify the cause of the abnormality. The non-volatile memory controller 137 stores the result of the analysis obtained by the cause analyzer 135 in the non-volatile memory 138. This facilitates the identification of the cause of the abnormality by referring to the result of the analysis stored in the non-volatile memory 138, and eliminates the need for subsequent work such as analysis of the state information and a simulation experiment. The result of the analysis is stored in the non-volatile memory 138, which ensures that the result of the analysis is retained, that is, not erased when the power source of the encoder 100 is turned OFF.

Assuming a comparative case where the encoder 100 is not provided with the cause analyzer 135, and that when an abnormality is detected, the encoder 100 stores the state information (for subsequent analysis use). In this comparative case, for accurate analysis, it is necessary to store a variety of pieces of state information related to the encoder 100 and the motor (M), which necessitates a large-capacity memory. In particular, when abnormalities are repeatedly detected, the amount of data of the state information to be stored becomes significantly large, which significantly increases the amount of the required memory capacity. In contrast, in this embodiment, the result of the analysis obtained by the cause analyzer 135 is stored, and thus it is not necessary to store the state information that has been used for the analysis, that is, the state information may be discarded. This significantly reduces the memory capacity, resulting in increased calculation speed and reduced cost, among other effects.

This embodiment provides the following effects. The detection of abnormality is determined based on whether a predetermined detection condition is satisfied. Thus, when the cause of the abnormality is identified, the state information corresponding to the time before the detection of the abnormality is no longer necessary. For accurate identification of abnormality, however, additional information is necessary after the detection condition is satisfied, such as information that indicates how long a defect is going to last, and information that indicates a possibility of recurrence of the defect. These kinds of information are difficult to analyze. In view of this, in this embodiment, the non-volatile memory controller 137 further stores in the non-volatile memory 138 the pieces of the state information corresponding to the time after the time of abnormality detection, in addition to the result of the analysis. By storing in the non-volatile memory 138 not only the result of the analysis but also the pieces of the state information corresponding to the time after the time of abnormality detection, the pieces of the state information are usable for subsequent identification of a defect. This improves the accuracy of abnormality detection.

In this embodiment, when the abnormality detector 132 detects the abnormality, the cause analyzer 135 identifies the cause of the abnormality by analyzing the pieces of the state information corresponding to the time before and after the point of time t=ta, which is the time of abnormality detection. Thus, the analysis is based on the pieces of the state information corresponding to the time before and after the point of time t=ta, which is the time of abnormality detection. This ensures detection of a constant abnormality or another abnormality that occurs over the time before and after the point of time t=ta, which is the time of abnormality detection. Further, this embodiment ensures identification of the cause of the abnormality in both cases where the abnormality is detected at the time of the abnormality occurrence (or immediately after the abnormality occurrence), and where the abnormality is detected after the abnormality has continued for a predetermined period of time. This improves analysis accuracy.

In this embodiment, the encoder 100 includes the volatile memory controller 133. The volatile memory controller 133 stores the state information in the volatile memory 134. The cause analyzer 135 analyzes the state information stored in the volatile memory 134 to identify the cause of the abnormality. Storing the state information in the volatile memory 134 ensures that unnecessary state information after completion of the analysis by the cause analyzer 135 may be discarded by turning OFF the power source of the encoder 100. This results in reduced memory capacity.

In this embodiment, the state information is stored in the volatile memory 134 in such a manner that multiple pieces of the state information corresponding to multiple points of time are stored until the predetermined storage area 1341 is full, and that once the storage area 1341 is full, the piece of the state information corresponding to the oldest point of time is overwritten with the piece of the state information corresponding to the latest point of time. This ensures that the constantly changing state information is at any time stored in its latest state during abnormality detection by the abnormality detector 132.

In this embodiment, when the abnormality detector 132 detects the abnormality, the time information generator 136 generates the time information of the point of time t=ta, which is the time of abnormality detection. The non-volatile memory controller 137 stores the time information in the non-volatile memory 138 in addition to the result of the analysis. This facilitates grasp of the time of abnormality occurrence. The time information is stored in the non-volatile memory 138, which ensures that time information is not erased when the power source of the encoder 100 is turned OFF.

In this embodiment, the first analyzer 1351 of the cause analyzer 135 uses the U-phase signal, the V-phase signal, and the W-phase signal respectively output from the light-receiving elements (PU, PV, PW) as the state information to identify an abnormal element from among the light-receiving elements (PU, PV, PW). This facilitates identification of an abnormal light-receiving element from among the light-receiving elements (PU, PV, PW) when the abnormality is detected.

In this embodiment, the second analyzer 1352 of the cause analyzer 135 uses the origin signal output from the light-receiving element (PO) and the incremental signals output from the light-receiving elements of the light-receiving array (PI) as the state information to identify an abnormal element from among the light-receiving element (PO) and the light-receiving elements of the light-receiving array (PI). This facilitates identification of an abnormal light-receiving element from among the light-receiving element (PO) and the light-receiving elements of the light-receiving array (PI) when the abnormality is detected.

Second Embodiment

Like reference numerals designate corresponding or identical elements throughout the first and second embodiments, and therefore such elements will not be further elaborated in the following description.

2-1. Encoder

A structure of the encoder 100 according to this embodiment will be described by referring to FIGS. 10 to 12.

Figure 10:
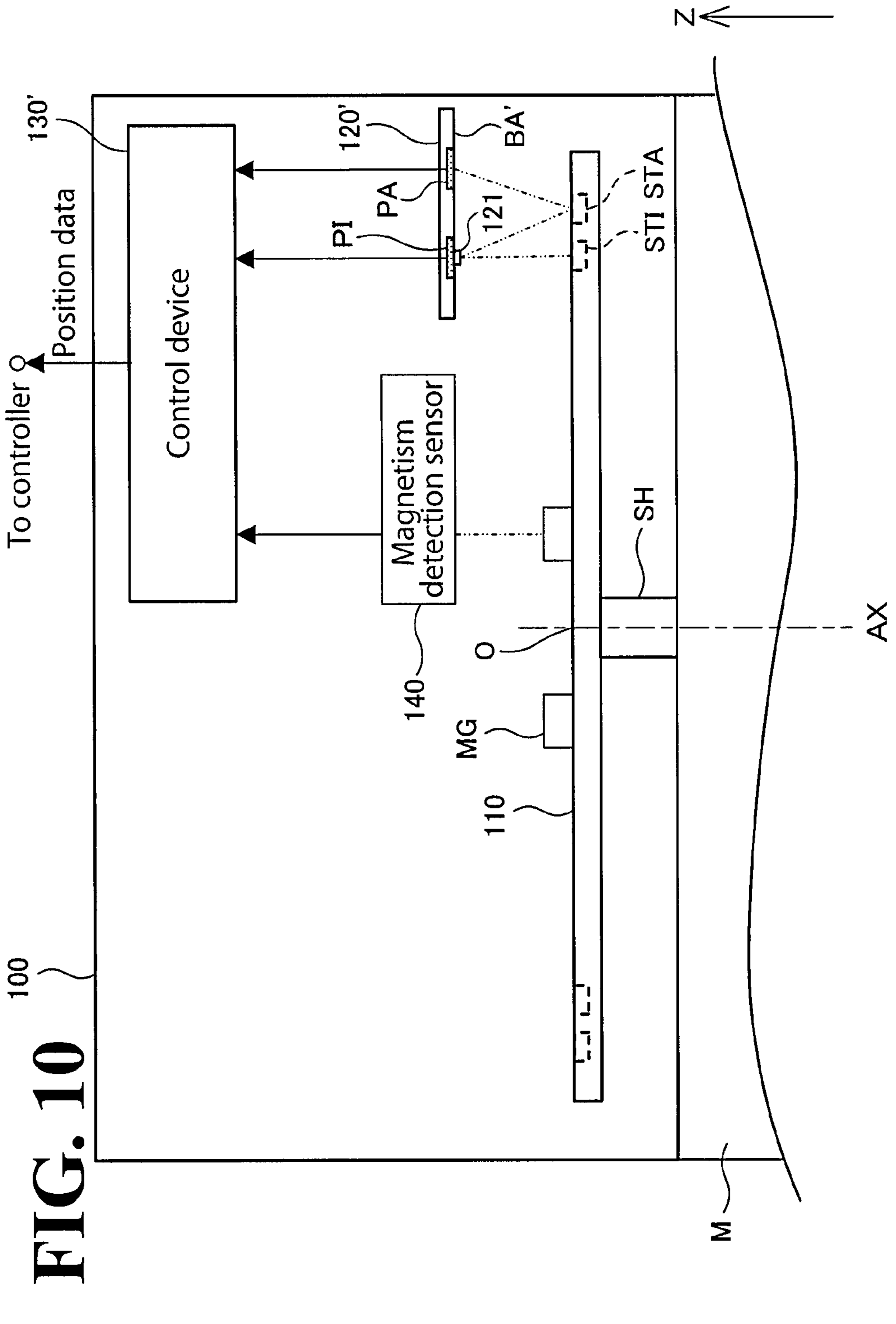
FIG. 10 is a diagram illustrating a structure of an encoder according to a second embodiment.
Figure 11:
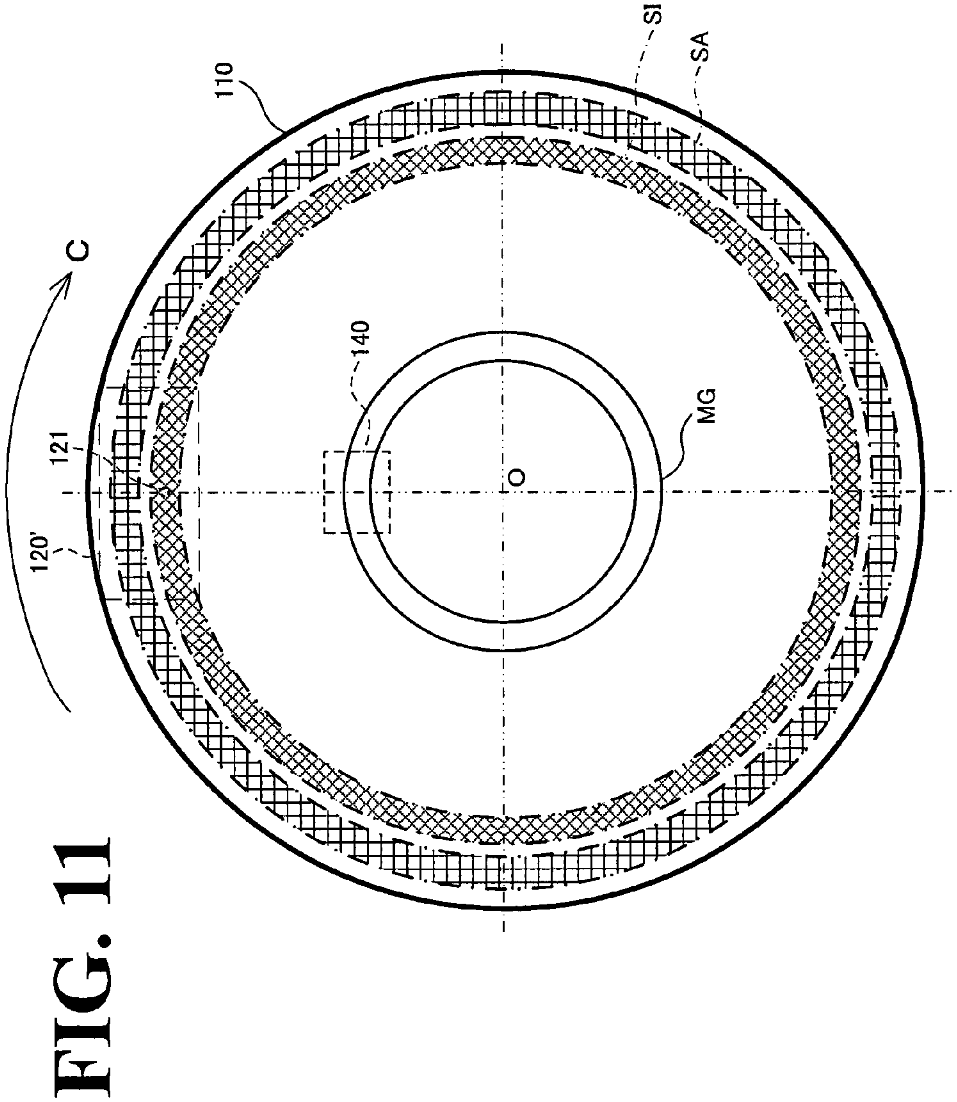
FIG. 11 is a diagram illustrating a structure of a disk according to the second embodiment.
Figure 12:
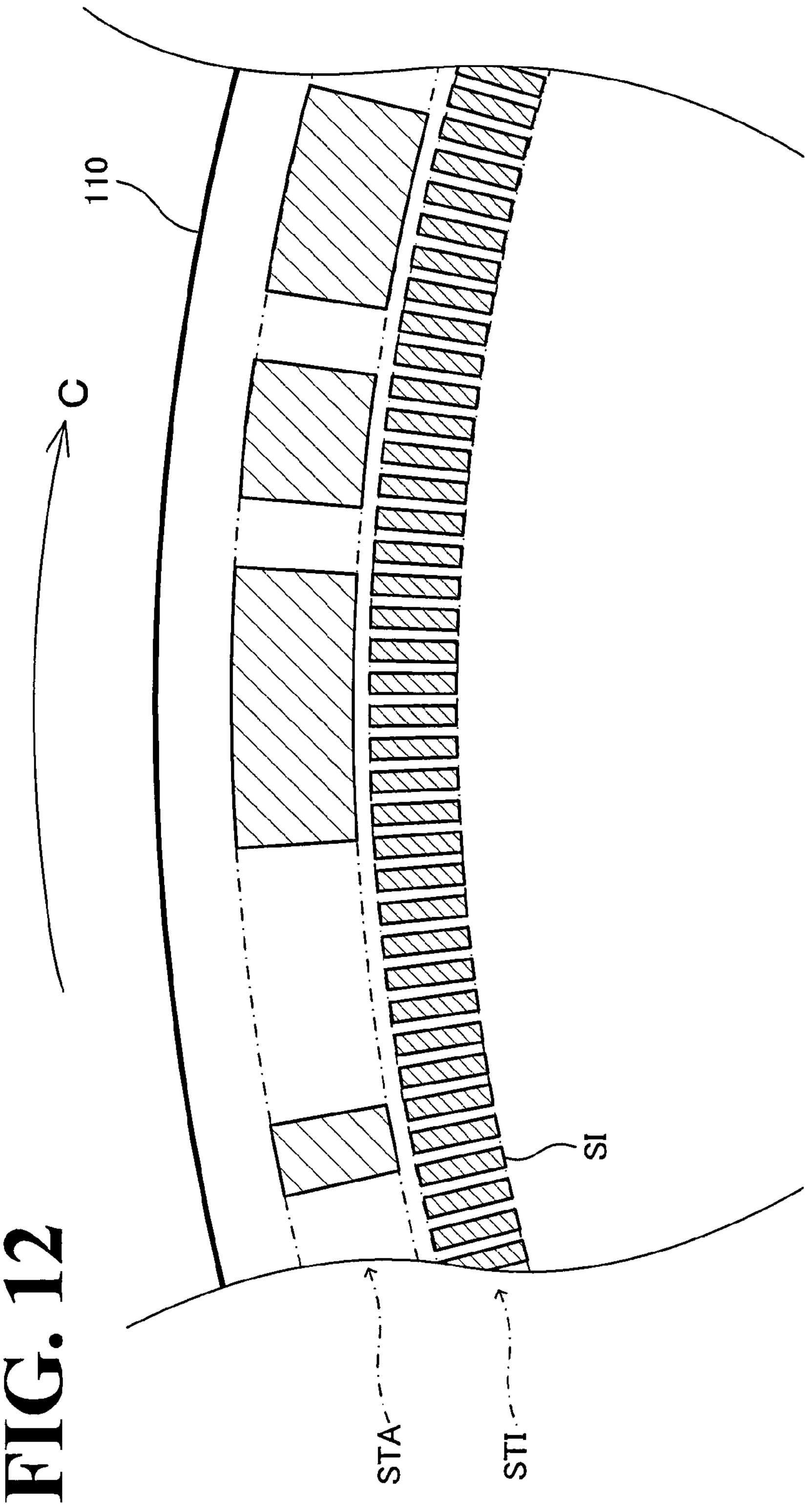
FIG. 12 is a diagram illustrating a structure of slit tracks according to the second embodiment.

As shown in FIGS. 10 to 12, the encoder 100 according to this embodiment includes the disk 110, an optical module 120', a magnetism detection sensor 140, and a control device 130'.

2-1-1. Disk

The disk 110 includes, on its upper surface, two slit tracks (STI, STA). The slit track (STI) is similar to the slit track (STI) in the first embodiment.

The slit track (STA) has a form of a ring around the disk center (O) and is disposed further outward than the slit track (STI). The slit track (STA) includes multiple reflection slits arranged throughout the track, forming an absolute pattern in the measurement direction (C). The term "absolute pattern" refers to a pattern in which the position, ratio, or another parameter of the reflection slits within the angle opposed to a light-receiving array (PA), described later, is uniquely determined in one rotation of the disk 110. Specifically, in the exemplary absolute pattern shown in FIG. 12, when the motor (M) is at one angular position, a combination of bit patterns indicating detection or undetection of the multiple light-receiving elements of the opposing light-receiving array (PA), described later, uniquely indicates the absolute position at the angular position.

This exemplary pattern ensures generation of a pattern that one-dimensionally indicates the absolute position of the motor (M) using bits corresponding to the number of the light-receiving elements of the light-receiving array (PA), described later. This, however, should not be construed as limiting the absolute pattern. For example, it is possible to use a pattern that multi-dimensionally indicates the absolute position using bits corresponding to the number of the light-receiving elements. Various other patterns than the predetermined bit pattern are possible; examples include a pattern in which a physical quantity such as the amount of light received by the light-receiving elements and the phase changes to uniquely indicate the absolute position, and a pattern in which a code sequence of the absolute pattern is modulated.

2-1-2. Optical Module

The optical module 120' has a form of a single substrate (BA') in parallel with the disk 110. On the lower surface of the substrate (BA') facing the disk 110, the optical module 120' includes the light source 121 and two light-receiving arrays (PI, PA). The light source 121 and the light-receiving array (PI) are respectively similar to the light source 121 and the light-receiving array (PI) in the first embodiment.

The light-receiving array (PA) includes multiple light-receiving elements (for example, nine in this embodiment) (not shown) arranged in the form of an array along a direction corresponding to the measurement direction (C). Each of the light-receiving elements of the light-receiving array (PA) receives the light emitted from the light source 121 and reflected by the reflection slit of the slit track (STA), converts the light into an electrical signal, and outputs the electrical signal. As described above, bit is used to indicate each individual reception and non-reception of the light by the light-receiving elements of the light-receiving array (PA), and the absolute position is indicated by nine bits. Thus, the electrical signal generated by each of the light-receiving elements is independently processed in a position data generator of the control device 130'. The absolute position coded into a serial bit pattern is decoded using a combination of the electrical signals. These electrical signals are each occasionally referred to as "absolute signal". The absolute signal output from each of the light-receiving elements of the light-receiving array (PA) is acquired by an absolute position detector 1314 of the control device 130', described later, to be used to detect the absolute position of the motor (M). That is, the light reflected by each reflection slit (SI) of the slit track (STA) is an example of the signal corresponding to the absolute position of the motor. Each of the light-receiving elements of the light-receiving array (PA) is an example of the absolute detection sensor.

2-1-3. Magnet and Magnetism Detection Sensor

On the upper surface of the disk 110, a magnet (Mg) to generate magnetism (magnetic field) is disposed. The magnet (Mg) is coaxially secured on the disk 110, and rotates together with the rotation of the disk 110. The magnet (Mg) has an annular shape, which covers the entire 360 degrees rotational angle range.

The magnetism detection sensor 140 is disposed in opposition to a part of the magnet (Mg) to detect the magnetism generated from the magnet (Mg), and outputs a signal (hereinafter occasionally referred to as "multi-rotation signal"). The multi-rotation signal output from the magnetism detection sensor 140 is acquired by a multi-rotation detector 1315 of the control device 130', described later, to be used to detect the multi-rotation amount of the motor (M).

There is no particular limitation to the magnetism detection sensor 140 insofar as the magnetism detection sensor 140 is capable of detecting the magnetism generated from the magnet (Mg). An example is a hole device.

2-1-4. Control Device

A structure of the control device 130' according to this embodiment will be described by referring to FIG. 13.

Figure 13:
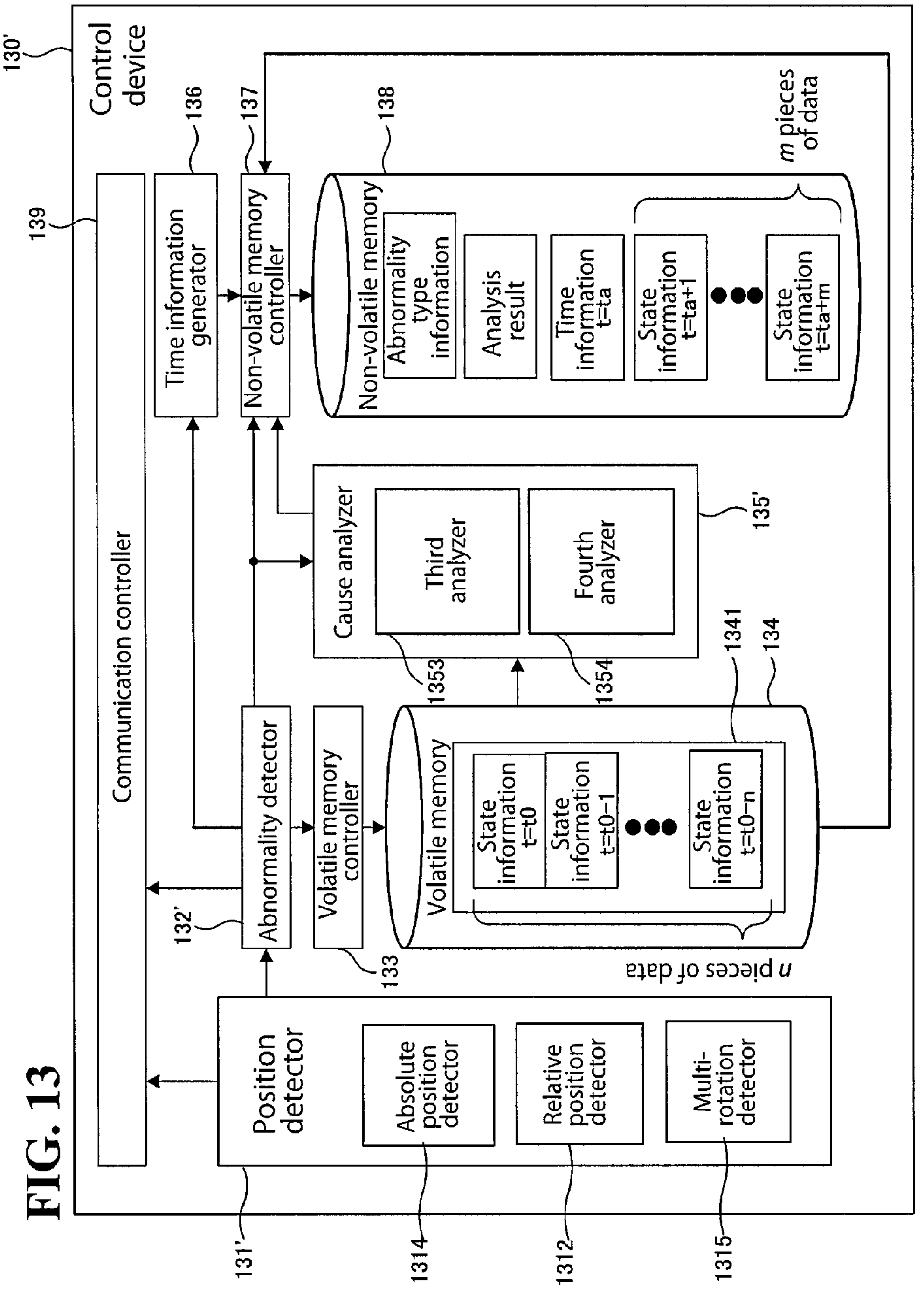
FIG. 13 is a diagram illustrating a structure of a control device according to the second embodiment.

As shown in FIG. 13, the control device 130' includes a position detector 131', an abnormality detector 132', the volatile memory controller 133, the volatile memory 134, a cause analyzer 135', the time information generator 136, the non-volatile memory controller 137, the non-volatile memory 138, and the communication controller 139. The volatile memory controller 133, the volatile memory 134, the time information generator 136, the non-volatile memory controller 137, and the non-volatile memory 138 are approximately similar to the respective elements in the first embodiment.

The position detector 131' includes the absolute position detector 1314, the relative position detector 1312, and the multi-rotation detector 1315. The relative position detector 1312 is similar to the relative position detector 1312 in the first embodiment.

The absolute position detector 1314 detects the absolute position of the motor (M) based on the absolute signals output from the light-receiving elements of the light-receiving array (PA). Specifically, the absolute position detector 1314 acquires the absolute signals output from the light-receiving elements of the light-receiving array (PA) at the timing when the absolute position detector 1314 measures the absolute position of the motor (M). The absolute position detector 1314 converts the acquired absolute signals into binary values, and converts the binary values into bit data indicating the absolute position of the motor (M). Then, the absolute position detector 1314 detects the absolute position of the motor (M) based on a predetermined relationship between the bit data and the absolute position of the motor (M).

Onto the absolute position of the motor (M) detected by the absolute position detector 1314, the position detector 131' superimposes the relative position of the motor (M) within one pitch detected by the relative position detector 1312. This ensures that the position detector 131' detects the absolute position of the motor (M) at a higher level of resolution than the absolute position detected based on the absolute signals. Then, the position detector 131' generates the position data (hereinafter occasionally referred to as "third position data") indicating the detected absolute position of the motor (M). The position detector 131' outputs the third position data to the communication controller 139. The communication controller 139 outputs the received third position data to the controller (CT).

The position detector 131' outputs to the abnormality detector 132' the third position data and data including data corresponding to the incremental signal and data corresponding to the absolute signal (hereinafter occasionally referred to as "second absolute position related data").

The multi-rotation detector 1315 detects the multi-rotation amount of the motor (M) based on the multi-rotation signal output from the magnetism detection sensor 140. Specifically, the multi-rotation detector 1315 acquires the multi-rotation signal from the magnetism detection sensor 140 at the timing when the multi-rotation detector 1315 measures the multi-rotation amount of the motor (M). Then, the multi-rotation detector 1315 detects the multi-rotation amount of the motor (M) based on the acquired multi-rotation signal.

The position detector 131' generates position data (hereinafter occasionally referred to as "fourth position data") indicating the multi-rotation amount of the motor (M) detected by the multi-rotation detector 1315. Then, the position detector 131' outputs the fourth position data to the communication controller 139. The communication controller 139 outputs the received fourth position data to the controller (CT).

The position detector 131' outputs the fourth position data and data (hereinafter occasionally referred to as "multi-rotation amount data") corresponding to the multi-rotation signal to the abnormality detector 132'.

The abnormality detector 132' acquires the state information at the timing when abnormality detector 132' monitors the abnormality related to the encoder 100 and/or the motor (M). There is no particular limitation to the abnormality monitored by the abnormality detector 132' insofar as the abnormality is related to the encoder 100 and/or the motor (M). In the following description, the abnormality monitored by the abnormality detector 132' is the abnormality related to the absolute position of the motor (M) and the abnormality related to the multi-rotation amount of the motor (M) for convenience of description. In this embodiment, the abnormality monitored by the abnormality detector 132' is the abnormality related to the absolute position of the motor (M) and the abnormality related to the multi-rotation amount of the motor (M). Here, the abnormality detector 132' acquires the following state information.

At the timing when the abnormality detector 132 monitors the abnormality related to the absolute position of the motor (M), the abnormality detector 132' acquires the third position data and the second absolute position related data as the state information from the position detector 131'. Here, the abnormality detector 132' determines whether a predetermined detection condition is satisfied based on the acquired third position data and second absolute position related data. In this manner, the abnormality detector 132' detects the abnormality related to the absolute position of the motor (M). There is no particular limitation to the method of detecting the abnormality related to the absolute position of the motor (M) for the abnormality detector 132'. An example of the method is as follows.

In normal state, the position (address) corresponding to the incremental signal matches the position (address) corresponding to the absolute signal. In abnormal state, the position corresponding to the incremental signal may not match the position corresponding to the absolute signal.

In view of this, the abnormality detector 132' detects the position corresponding to the incremental signal and the position corresponding to the absolute signal based on the acquired second absolute position related data. Then, the abnormality detector 132' determines whether the position corresponding to the incremental signal matches the position corresponding to the absolute signal. When the position corresponding to the incremental signal does not match the position corresponding to the absolute signal, the abnormality detector 132' detects the abnormality related to the absolute position of the motor M.

The above-described method of detecting the abnormality related to the absolute position of the motor (M) performed by the abnormality detector 132' is provided for exemplary purposes; it is possible to use any other method.

At the timing when the abnormality detector 132' monitors the abnormality related to the multi-rotation amount of the motor (M), the abnormality detector 132' acquires from the position detector 131' the state information, namely, the fourth position data, the multi-rotation amount data, and the data corresponding to the incremental signal. Here, the abnormality detector 132' determines whether the predetermined detection condition is satisfied based on the fourth position data, the multi-rotation amount data, and the data corresponding to the incremental signal thus acquired. In this manner, the abnormality detector 132' detects the abnormality related to the multi-rotation amount of the motor (M). There is no particular limitation to the method of detecting the abnormality related to the multi-rotation amount of the motor (M) for the abnormality detector 132'. An example of the method is as follows.

In normal state, the multi-rotation amount corresponding to the incremental signal matches the multi-rotation amount corresponding to the multi-rotation signal. In abnormal state, the multi-rotation amount corresponding to the incremental signal may not match the multi-rotation amount corresponding to the multi-rotation signal.

In view of this, the abnormality detector 132' detects the multi-rotation amount corresponding to the incremental signal and the multi-rotation amount corresponding to the multi-rotation signal based on the data corresponding to the incremental signal and the multi-rotation data thus acquired. Then, the abnormality detector 132' determines whether the multi-rotation amount corresponding to the incremental signal matches the multi-rotation amount corresponding to the multi-rotation signal. When the multi-rotation amount corresponding to the incremental signal does not match the multi-rotation amount corresponding to the multi-rotation signal, the abnormality detector 132' detects the abnormality related to the multi-rotation of the motor (M).

The above-described method of detecting the abnormality related to the multi-rotation of the motor (M) performed by the abnormality detector 132' is provided for exemplary purposes; it is possible to use any other method.

Then, the abnormality detector 132' sequentially outputs to the volatile memory controller 133 the state information used to monitor the abnormality related to the absolute position of the motor (M) and the state information used to monitor the abnormality related to the multi-rotation of the motor (M). When the abnormality detector 132' detects each of the abnormality related to the absolute position of the motor (M) and the abnormality related to the multi-rotation of the motor (M), the abnormality detector 132' outputs the alarm signal to the communication controller 139, the cause analyzer 135', the non-volatile memory controller 137, and the time information generator 136.

The cause analyzer 135' includes a third analyzer 1353 and a fourth analyzer 1354.

The third analyzer 1353 uses the incremental signals output from the light-receiving elements of the light-receiving array (PI) and the absolute signals output from the light-receiving elements of the light-receiving array (PA) as the state information to identify an abnormal element from among the light-receiving elements of the light-receiving array (PA) and the light-receiving elements of the light-receiving array (PI). Specifically, when the third analyzer 1353 receives the alarm signal indicating the abnormality related to the absolute position of the motor (M), the third analyzer 1353 identifies an abnormal element from among the light-receiving elements of the light-receiving array (PA) and the light-receiving elements of the light-receiving array (PI) based on the second absolute position related data as the state information stored in the volatile memory 134. There is no particular limitation to the identification method for the third analyzer 1353.

The fourth analyzer 1354 uses the incremental signals output from the light-receiving elements of the light-receiving array (PI) and the multi-rotation signal output from the magnetism detection sensor 140 as the state information to identify an abnormal element or sensor from among the light-receiving elements of the light-receiving array (PI) and the magnetism detection sensor 140. Specifically, when the fourth analyzer 1354 receives the alarm signal indicating the abnormality related to the multi-rotation of the motor (M), the fourth analyzer 1354 identifies an abnormal element or sensor from among the light-receiving elements of the light-receiving array (PI) and the magnetism detection sensor 140 based on the multi-rotation data and the data corresponding to the incremental signal as the state information stored in the volatile memory 134. There is no particular limitation to the identification method for the fourth analyzer 1354.

When the third analyzer 1353 performs the analysis, the cause analyzer 135' outputs the result of the analysis performed by the third analyzer 1353 to the non-volatile memory controller 137. When the fourth analyzer 1354 performs the analysis, the cause analyzer 135' outputs the result of the analysis performed by the fourth analyzer 1354 to the non-volatile memory controller 137.

2-2. Exemplary Effects of this Embodiment

The encoder 100 according to this embodiment described above provides effects similar to the effects that the first embodiment provides. In particular, in this embodiment, the third analyzer 1353 of the cause analyzer 135' uses the incremental signals output from the light-receiving elements of the light-receiving array (PI) and the absolute signals output from the light-receiving elements of the light-receiving array (PA) as the state information to identify an abnormal element from among the light-receiving elements of the light-receiving array (PA) and the light-receiving elements of the light-receiving array (PI). The fourth analyzer 1354 of the cause analyzer 135' uses the incremental signals output from the light-receiving elements of the light-receiving array (PI) and the multi-rotation signal output from the magnetism detection sensor 140 as the state information to identify an abnormal element or sensor from among the light-receiving elements of the light-receiving array (PI) and the magnetism detection sensor 140. This facilitates identification as to identify an abnormal element or sensor from among the light-receiving elements of the light-receiving array (PI), the light-receiving elements of the light-receiving array (PA), and the magnetism detection sensor 140 when the abnormality is detected.

3. Modifications

The embodiments have been described in detail by referring to the drawings. It will be readily appreciated, however, that the technical scope of the appended claims will not be limited to the embodiments described herein. Various modifications, alterations, and combinations of the embodiments will be apparent to those skilled in the art to which the disclosed embodiments belong. Therefore, the present disclosure is to cover all modifications, alterations, and combinations that fall within the spirit and scope of the present disclosure.

For example, in the above-described embodiments, the non-volatile memory controller 137 stores information such as the result of the analysis by the cause analyzer (135 or 135') in the non-volatile memory 138 of the encoder 100. This example in the disclosed embodiments, however, should not be construed in a limiting sense. Another possible example is that the non-volatile memory controller 137 stores information such as the result of the analysis by the cause analyzer (135 or 135') in an external non-volatile memory of the encoder 100 (for example, a non-volatile memory coupled to the encoder 100 through what is called a network cloud).

In the above-described embodiments, the encoder 100 has been described as a "reflective encoder", in which both the light source 121 and the light-receiving elements are disposed on the side of the substrate (BA) of the optical module 120. This example in the disclosed embodiments, however, should not be construed in a limiting sense. Another possible example is that the encoder is what is called a "transmission encoder", in which the light source 121 and the light-receiving elements are opposed to each other across the disk. In this case, the disk may be provided with a slit track having multiple transmission slits through which to transmit the light emitted from the light source 121. This enables the light-receiving elements to receive the light emitted from the light source 121 and transmitted through the transmission slits of the slit track.

As used herein, the term "parallel" may not necessarily mean "parallel" in a strict sense. Specifically, the term "parallel" means "approximately parallel", and there may be design-related and production-related tolerance and error.

As used herein, the term "uniform" may not necessarily mean "uniform" in a strict sense. The term "uniform" means "approximately equivalent", and there may be design-related and production-related tolerance and error.

The arrows shown in FIGS. 5 and 13 indicate exemplary flows of signals. The arrows should not be construed as limiting the flowing directions of the signals.

The flowchart shown in FIG. 9 should not be construed as limiting the embodiments to the illustrated procedure. The procedure is open to addition and deletion, and the order is open to change without departing from the technical scope of the present disclosure.

Otherwise, the above-described embodiments and modifications may be combined in any manner deemed suitable.

Obviously, numerous modifications and variations of the present invention are possible in light of the above teachings. It is therefore to be understood that within the scope of the appended claims, the invention may be practiced otherwise than as specifically described herein.

What is claimed is:

1. An encoder, comprising:

a measurement target coupled to a motor;

a module positioned relative to the measurement target and configured to generate signals based on motion of the measurement target; and a control device configured to generate and output position data based on the signals from the module and comprising a position detector, an abnormality detector, a cause analyzer, a non-volatile memory, and a non-volatile memory controller, wherein the position detector is configured to detect a position of the motor, the abnormality detector is configured to detect an abnormality based on state information including a state of the position detector, the cause analyzer is configured to analyze the state information when the abnormality detector detects the abnormality such that a cause of the abnormality detected by the abnormality detector is identified, and the non-volatile memory controller is configured to store in the non-volatile memory a result of analysis obtained by the cause analyzer.

2. The encoder according to claim 1, wherein the non-volatile memory controller is configured to store in the non-volatile memory a point of time after the abnormality detector detects the abnormality.

3. The encoder according to claim 2, wherein the control device includes a volatile memory and a volatile memory controller configured to store the state information in the volatile memory, and the cause analyzer is configured to analyze the state information stored in the volatile memory such that the cause of the abnormality is identified.

4. The encoder according to claim 2, wherein the control device includes a time information generator configured to generate time information at a point of time the abnormality detector detects the abnormality, and the non-volatile memory controller is configured to store the time information in the non-volatile memory.

5. The encoder according to claim 1, wherein the cause analyzer is configured to analyze a point of time before the abnormality detector detects the abnormality and a point of time after the abnormality detector detects the abnormality such that the cause of the abnormality detected by the abnormality detector is identified.

6. The encoder according to claim 5, wherein the cause analyzer is configured to analyze a point of time before the abnormality detector detects the abnormality and a point of time after the abnormality detector detects the abnormality such that the cause of the abnormality is identified.

7. The encoder according to claim 6, wherein the control device includes a volatile memory and a volatile memory controller configured to store the state information in the volatile memory, and the cause analyzer is configured to analyze the state information stored in the volatile memory such that the cause of the abnormality is identified.

8. The encoder according to claim 5, wherein the control device includes a volatile memory and a volatile memory controller configured to store the state information in the volatile memory, and the cause analyzer is configured to analyze the state information stored in the volatile memory such that the cause of the abnormality is identified.

9. The encoder according to claim 5, wherein the control device includes a time information generator configured to generate time information at a point of time the abnormality detector detects the abnormality, and the non-volatile memory controller is configured to store the time information in the non-volatile memory.

10. The encoder according to claim 1, wherein the control device includes a volatile memory and a volatile memory controller configured to store the state information in the volatile memory, and the cause analyzer is configured to analyze the state information stored in the volatile memory such that the cause of the abnormality is identified.

11. The encoder according to claim 10, wherein the volatile memory controller is configured to store a plurality of points of time until a storage area is full, and when the storage area is full, the volatile memory controller is configured to overwrite an oldest point of time with a latest point of time.

12. The encoder according to claim 11, wherein the control device includes a time information generator configured to generate time information at a point of time the abnormality detector detects the abnormality, and the non-volatile memory controller is configured to store the time information in the non-volatile memory.

13. The encoder according to claim 10, wherein the control device includes a time information generator configured to generate time information at a point of time the abnormality detector detects the abnormality, and the non-volatile memory controller is configured to store the time information in the non-volatile memory.

14. The encoder according to claim 1, wherein the control device includes a time information generator configured to generate time information at a point of time the abnormality detector detects the abnormality, and the non-volatile memory controller is configured to store the time information in the non-volatile memory.

15. The encoder according to claim 1, wherein the position detector includes a magnetic-pole detector, the magnetic-pole detector has a plurality of magnetic-pole detection sensors configured to output signals corresponding to magnetic-pole positions of the motor and is configured to detect the magnetic-pole positions of the motor based on the signals from the magnetic-pole detection sensors, the state information includes the signals output from the magnetic-pole detection sensors, and the cause analyzer comprises a first analyzer configured to identify an abnormal sensor in the plurality of magnetic-pole detection sensors based on the state information.

16. The encoder according to claim 1, wherein the position detector includes an origin position detector and a relative position detector, the origin position detector has an origin detection sensor configured to output a signal corresponding to an origin position of the motor and is configured to detect the origin position of the motor based on the signal from the origin detection sensor, the relative position detector includes an incremental detection sensor configured to output a signal corresponding to a relative position of the motor and is configured to detect the relative position of the motor based on the signal from the incremental detection sensor, the state information includes the signal output from the origin detection sensor and the signal output from the incremental detection sensor, and the cause analyzer comprises a second analyzer configured to identify an abnormal sensor in the origin detection sensor and the incremental detection sensor based on the state information.

17. The encoder according to claim 1, wherein the position detector includes a relative position detector, an absolute position detector and a multi-rotation detector, the relative position detector has an incremental detection sensor configured to output a signal corresponding to a relative position of the motor and is configured to detect the relative position of the motor based on the signal from the incremental detection sensor, the absolute position detector has an absolute detection sensor configured to output a signal corresponding to an absolute position of the motor and is configured to detect the absolute position of the motor based on the signal from the absolute detection sensor, the multi-rotation detector has a magnetism detection sensor configured to output a signal corresponding a magnetism generated by a magnet of the motor and is configured to detect a multi-rotation amount of the motor based on the signal from the magnetism detection sensor, the state information includes the signal output from the incremental detection sensor, the signal output from the absolute detection sensor and the signal output from the magnetism detection sensor, the cause analyzer comprises a third analyzer configured to identify an abnormal sensor among the incremental detection sensor and the absolute detection sensor based on the state information and a fourth analyzer configured to identify an abnormal sensor among the incremental detection sensor and the magnetism detection sensor based on the state information.

18. A servomotor, comprising:

a motor; and an encoder configured to detect at least one of position information and speed information of the motor and comprising a measurement target coupled to the motor, a module positioned relative to the measurement target and configured to generate signals based on motion of the measurement target, and a control device configured to generate and output position data based on the signals from the module and comprising a position detector, an abnormality detector, a cause analyzer, a non-volatile memory, and a non-volatile memory controller, wherein the position detector is configured to detect a position of the motor, the abnormality detector is configured to detect an abnormality based on state information including a state of the position detector, the cause analyzer is configured to analyze the state information when the abnormality detector detects the abnormality such that a cause of the abnormality detected by the abnormality detector is identified, and the non-volatile memory controller is configured to store in the non-volatile memory a result of analysis obtained by the cause analyzer.

19. A servo system, comprising:

the servomotor according to claim 18; and a controller configured to control the motor in the servomotor based on position data received from the encoder in the servomotor.

20. A signal processing method for an encoder, comprising:

detecting an abnormality based on state information including a state of a position detector in an encoder;

analyzing the state information when the abnormality is detected such that a cause of the abnormality is identified; and storing in a non-volatile memory a result of analysis for the cause of the abnormality obtained in the analyzing of the state information, wherein the position detector is configured to detect a position of a motor coupled to a measurement target in the encoder.

* * * * *